US006480963B1

(12) United States Patent
Tachibana et al.

(10) Patent No.: US 6,480,963 B1
(45) Date of Patent: Nov. 12, 2002

(54) NETWORK SYSTEM FOR TRANSPORTING SECURITY-PROTECTED DATA

(75) Inventors: Hirotaka Tachibana, Kawasaki (JP); Seiichi Urita, Kawasaki (JP); Seigo Kotani, Kawasaki (JP); Takehiko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/225,212

(22) Filed: Jan. 4, 1999

(30) Foreign Application Priority Data

Jun. 17, 1998 (JP) .............................. 10-169698

(51) Int. Cl.[7] .............................................. H04L 9/00
(52) U.S. Cl. ...................... 713/201; 713/200; 713/202; 713/166
(58) Field of Search ................................ 713/166, 200, 713/172, 156, 168, 176, 155, 151, 201

(56) References Cited

U.S. PATENT DOCUMENTS

| | | | | | |
|---|---|---|---|---|---|
| 5,689,566 A | * | 11/1997 | Nguyen | ........................ | 380/25 |
| 6,049,891 A | * | 4/2000 | Inamoto | ........................ | 714/6 |
| 6,128,735 A | * | 10/2000 | Goldstein et al. | ............ | 713/166 |
| 6,230,267 B1 | * | 5/2001 | Richards et al. | ............ | 713/172 |

* cited by examiner

*Primary Examiner*—Ly V. Hua
(74) *Attorney, Agent, or Firm*—Staas & Halsey LLP

(57) ABSTRACT

A network system with integrated security protection facilities. The system involves a transmission unit and a reception unit, which are coupled to each other via a network. In the transmission unit, a data management unit performs centralized management of source data that is stored in a plurality of storage units in a distributed manner. In response to a data transmission request from a terminal local to the transmission unit, a data collection unit collects requested data items from the data management unit. A security processor applies appropriate security protection processes to the collected data, depending on its data confidentiality level. An identification data attaching unit attaches identification data to the transmission data. This identification data informs the recipient of what sequence of security process primitives has been applied to the source data. A transmitter sends out the security-protected data over the network. In the reception unit, a receiver accepts the data sent from the transmission unit, and an identification data extracting unit extracts the identification data attached to the received data. With this identification data, an unprotection unit unprotects the received data, thereby reconstructing the original data contents.

15 Claims, 32 Drawing Sheets

| DOCUMENT NAME | | | CONFIDENTIALITY LEVEL |
|---|---|---|---|
| PC | MOTHER-BOARD | DESIGN SPECIFICATION | 6 |
| | | COST | 10 |
| | | PRODUCTION PLAN | 5 |
| | HDD | DESIGN SPECIFICATION | 7 |
| ⋮ | ⋮ | ⋮ | ⋮ |

| COMPANY NAME | DIVISION | ID | OPERATIONS | ACCESS PRIVILEGE LEVEL |
|---|---|---|---|---|
| FFF CORPO-RATION | AA DEPARTMENT | 01 | PC | 1 |
| | | | HDD | 3 |
| | BB DEPARTMENT | 01 | BOARD | 1.5 |
| GGG LIMITED | AA DEPARTMENT | 01 | HDD | 2.1 |
| ... | ... | ... | ... | ... |

FIG. 8

| COMPANY NAME | DIVISION | NETWORK ENVIRON-MENT | SYSTEM ENVIRON-MENT | OPERATING ENVIRON-MENT | OVERALL ENVIRON-MENT |
|---|---|---|---|---|---|
| FFF CORPORATION | AA DEPARTMENT | 6 | 7 | 5 | 6 |
|  | BB DEPARTMENT | 4 | 2 | 3 | 3 |
| GGG LIMITED | AA DEPARTMENT | 3 | 1 | 2.3 | 2.1 |
|  | BB DEPARTMENT | 6 | 10 | 8 | 8 |
| ... |  | ... | ... | ... | ... |

| FILTER NO. | DATA CONFIDENTIALITY LEVEL $\alpha$ | ACCESS PRIVILEGE LEVEL $\beta$ | SYSTEM SECURITY LEVEL $\gamma$ |
|---|---|---|---|
| 1 | $1 \leq \alpha < 5$ | $2 < \beta \leq 6$ | $2 < \gamma \leq 6$ |
| 2 | $1 \leq \alpha < 5$ | $2 < \beta \leq 6$ | $6 < \gamma \leq 10$ |
| 3 | $1 \leq \alpha < 5$ | $6 < \beta \leq 10$ | $2 < \gamma \leq 6$ |
| 4 | $1 \leq \alpha < 5$ | $6 < \beta \leq 10$ | $6 < \gamma \leq 10$ |
| 5 | $5 \leq \alpha < 9$ | $2 < \beta \leq 6$ | $2 < \gamma \leq 6$ |
| 6 | $5 \leq \alpha < 9$ | $2 < \beta \leq 6$ | $6 < \gamma \leq 10$ |
| 7 | $5 \leq \alpha < 9$ | $6 < \beta \leq 10$ | $2 < \gamma \leq 6$ |
| 8 | $5 \leq \alpha < 9$ | $6 < \beta \leq 10$ | $6 < \gamma \leq 10$ |

FIG. 10

| SECURITY FILTER NO. | a | b | | c | d | e | | | | f | | ... |
|---|---|---|---|---|---|---|---|---|---|---|---|---|
| | 1 | 1 | 2 | 1 | 1 | 1 | 2 | 3 | 4 | 1 | 2 | |
| 1 | ① | | | | ② | | | | | | | |
| 2 | ① | | | | | | | | | | | |
| 3 | | | | ① | | ② | | | | | | |
| 4 | | | | | ① | ② | | | | | | |
| 5 | ① | | ② | | | ③ | | | | ④ | | |
| 6 | ① | | ② | | | | ③ | | | | ④ | |
| 7 | | | | | | | ① | | | ② | | |
| 8 | | | | | | | | | ① | | ② | |

FIG. 11

| SYMBOL | CLASSIFICATION | No. | PROCESS |
|---|---|---|---|
| a | AUTHENTICATION | 1 | PC-CARD |
| b | SIGNATURE | 1 | PC-CARD |
| | | 2 | MD5 |
| c | ELECTRONIC WATERMARK | 1 | W-MARK |
| d | ANTI-VIRUS | 1 | VACCINE |
| e | DATA COMPRESSION | 1 | LHA |
| | | 2 | COMPRESS |
| | | 3 | GZIP |
| | | 4 | FLDC |
| f | CRYPTOGRAPHY | 1 | DES |
| | | 2 | RSA |
| ⋮ | ⋮ | ⋮ | ⋮ |

FIG. 12

| | DOCUMENT NAME | | | CONFIDENTIALITY LEVEL |
|---|---|---|---|---|
| PC | MOTHER-BOARD | DESIGN SPECIFICATION | CPU | 6 |
| | | | POWER SUPPLY | 1 |
| | | | MEMORY | 6 |
| | | | CONNECTOR | 6 |
| | | COST | | 10 |
| | | PRODUCTION PLAN | | 5 |
| | HDD | DESIGN SPECIFICATION | | 7 |
| ⋮ | ⋮ | ⋮ | | ⋮ |

FIG. 21

NETWORK SYSTEM FOR TRANSPORTING SECURITY-PROTECTED DATA

BACKGROUND OF THE INVENTION

1. Field of the Invention

The present invention relates to a network system, a data transmission and reception method, a transmission unit, a reception unit, and a computer-readable medium for storing a program for secure data transmission. More particularly, the present invention relates to a method and system for enabling a transmission unit to transmit data to a reception unit after applying appropriate security processes to the data. It also relates to a transmission unit and a reception unit to transport security-protected data, as well as to a computer-readable medium for storing a program that causes computers to send and receive security-protected data.

2. Description of the Related Art

Modern network communications systems often employ facilities for security measures, such as cryptography, to protect transmission data from the potential risk of piracy, alteration, and other illegal access to the data. Suppose, for example, that a person in a company is attempting to send some data to another company. The person accomplishes this task typically by performing the following steps:

(1) collecting the intended source data from various storage places on his/her company's local area network (LAN), (2) checking the confidentiality level of each data item, based on the company's security policy, (3) determining which security processes to apply to each data item, according to an overall consideration of what type of network (e.g., leased lines, value-added networks, or open networks) will be used to transport data, and what system environment the recipient company has, in addition to the data confidentiality levels identified above, (4) applying the determined security processes to individual data items in a step by step manner, (5) notifying the recipient, in advance, of what kinds of security processes have been applied to the data that they will receive, and (6) transmitting the security-protected data to the recipient.

The above conventional procedure, however, has the following problems. At step (1), the user has to locate and retrieve each desired data item manually. Besides being unfavorable in terms of work efficiency, this step of data collection raises a problem with the validity of data. More specifically, the process of step (1) "physically" copies each data from one medium to another, thus producing such a situation where two data instances having the same content coexist in a single system. When the original data is changed, its replica may not always be updated in a timely manner, resulting in two inconsistent versions.

Step (2) also burdens the end user with inefficient work of surveying the confidentiality level of each individual data item, using manuals or other documents that describe his/her company's security policies. Additionally, the confidentiality levels determined as such are likely to reflect more or less the user's personal view. This introduces some inconsistency to the resulting security levels when the same data is processed by different people. Another problem is that alterations to the company's security policies may not immediately become effective, but it takes some time, in general, for the employees to get used to the new rules. This may lead to a worst case scenario where important company-confidential information could leak out.

With respect to step (3), it is difficult for the end users to set up the details of security processes for individual data items to be transmitted, since this step requires complicated tasks. To alleviate their burden, security processes are often selected in accordance with the highest confidentiality level, although not every data item requires it. This method, however, is inefficient since it often applies unnecessary protection to transmission data. Another problem with this method is that it relies on the skill levels of individual end users, particularly when the company's security policy manual cannot provide practical solution. This dependency on the individuals introduces some ambiguity to the company's security processing. Still another disadvantage of the conventional system is that it takes much time to migrate from the existing system to a new system. This causes a problem when attempting to revise a security agreement with a partner company.

Step (4) requires the end users to purchase necessary software applications for security processing, set up them, and operate them. This actually imposes heavy workloads on the users. Also, software upgrades will often cause a problem in the consistency of software versions among a plurality of end user terminals, where security processing applications are typically installed. Inconsistency between the sender and the receiver sometimes blocks data unprotection processes. Installation of new software applications would cause the same problems.

Furthermore, it is not always true that end users can keep a correct sequence of security processes. Without keeping correct order, some security processes cannot fully provide their performance. For example, data compression programs will not yield good compression ratios when the source data is encrypted, or scrambled. Running an anti-virus application to check an encrypted data file is totally nonsense. Carelessness of some end users may even cause a data transmission without applying any security measures, exposing the company's confidential data to a serious risk of information leakage.

Lastly, the step (5) requires the recipient to know the exact procedure of data protection. Without this information, the recipient cannot unprotect the received data. Another problem at the recipient's side is that the burden of security processing can be sometimes intolerable, because different security policies should be used to communicate with different companies or different partners.

SUMMARY OF THE INVENTION

Taking the above into consideration, an object of the present invention is to provide a method and system for safely delivering data to destination sites on a network, without depending on the skill levels of individual end users.

Another object of the present invention is to provide a transmission unit which alleviates workloads imposed on the end users when protecting the transmission data with security processes.

Still another object of the present invention is to provide a reception unit which automatically unprotects the received data in a reliable manner.

To accomplish the above objects, according to the present invention, there is provided a network system in which a sender transmits data to a recipient over a network, after applying appropriate security processes to the data. This system comprises a transmission unit and a reception unit, which are coupled to each other via the network. The transmission unit comprises: (a1) a security processor which applies security processes to data to be transmitted to the recipient, where the security processes are selected as being relevant to a data confidentiality level that is determined from data attribute information and communication environment, (a2) an identification data attaching unit which attaches identification data to the data to allow the recipient to identify the security processes that the security processor has applied, and (a3) a transmitter which transmits the data over the network to the recipient, together with the identification data being attached thereto. The reception unit, on the other hand, comprises: (b1) a receiver which receives the data that is sent over the network by the transmission unit, (b2) an identification data extracting unit which extracts the identification data that is attached to the received data, and (b3) an unprotection unit which unprotects the data by using the identification data extracted by the identification data extracting unit.

The above and other objects, features and advantages of the present invention will become apparent from the following description when taken in conjunction with the accompanying drawings which illustrate a preferred embodiments of the present invention by way of example.

BRIEF DESCRIPTION OF THE DRAWINGS

FIG. 7 is a diagram which shows an example of data stored in a data confidentiality level table shown in FIG. 2;

FIG. 8 is a diagram which shows an example of data stored in an access privilege level table shown in FIG. 2;

FIG. 9 is a diagram which shows an example of data stored in a system security level table shown in FIG. 2;

FIG. 10 is a diagram which shows an example of data store in a security setting table shown in FIG. 2;

FIG. 11 is a diagram which shows an example of data stored in a security filter management table shown in FIG. 2;

FIG. 12 is a diagram which shows an example of other data stored in the security filter management table;

FIG. 21 is a diagram which shows a data confidentiality level table for the data items shown in FIG. 19;

DESCRIPTION OF THE PREFERRED EMBODIMENTS

Several preferred embodiments of the present invention will be described below with reference to the accompanying drawings.

Figure 1:
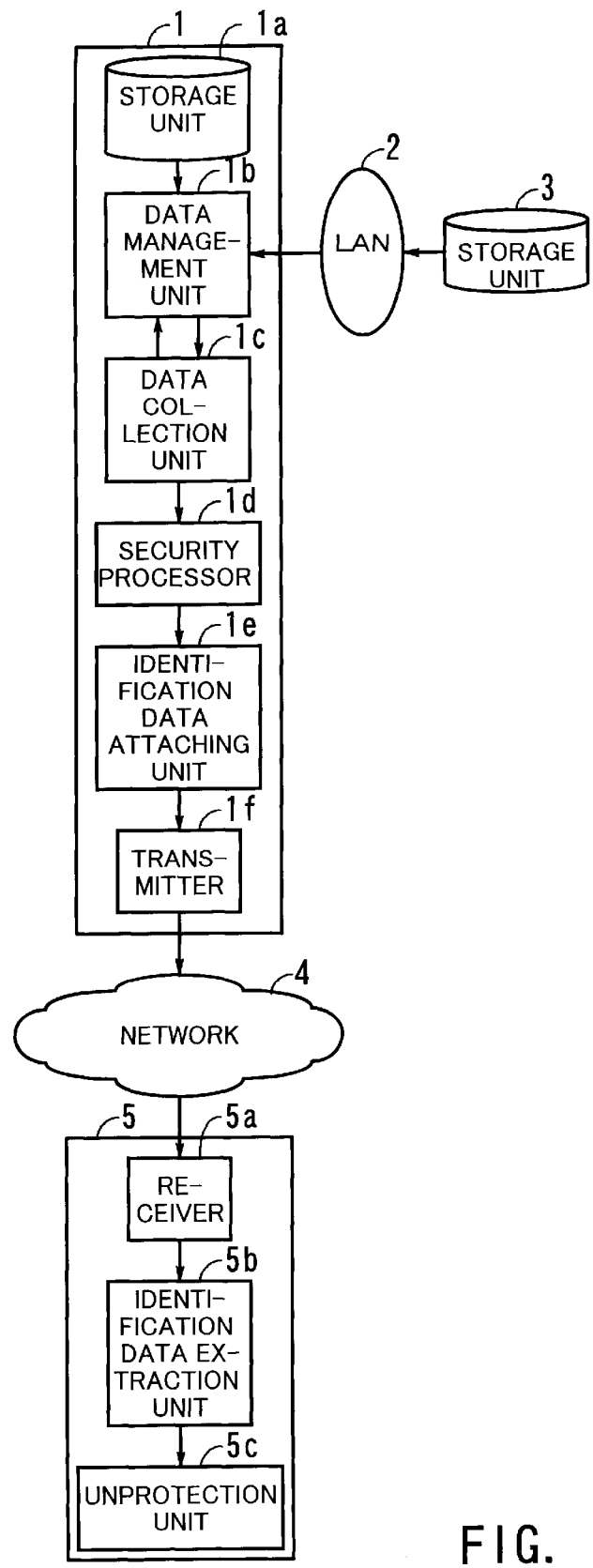
FIG. 1 is a conceptual view of the present invention.

FIG. 1 shows the concept of the present invention, illustrating a network system which transports data from a transmission unit 1 to a reception unit 5. The transmission unit 1 comprises a storage unit 1a, a data management unit 1b, a data collection unit 1c, a security processor 1d, an identification data attaching unit 1e, and a transmitter 1f. Besides being linked to a storage unit 3 via a local area network (LAN) 2, the transmission unit 1 is connected to the reception unit 5 via another network 4. The reception unit 5 comprises a receiver 5a, an identification data extraction unit 5b, and an unprotection unit 5c.

Inside the transmission unit 1, the storage unit 1a, comprising hard disk drives (HDD), stores various data items including transmission data to the reception unit 5. The data management unit 1b manages data stored in the storage units 1a and 3 in a concentrated manner by using a logical structure database (described later). The data collection unit 1c collects transmission data items, searching the logical structure database that the data management unit 1b has. The security processor 1d applies appropriate security processes to the data items collected by the data collection unit 1c, depending on their respective confidentiality levels. The identification data attaching unit 1e attaches some additional identification data to the security-protected data to indicate what security processes the security processor 1d has conducted. The transmitter 1f transmits the data to the reception unit 5 over the network 4, together with the identification data.

In the reception unit 5, the receiver 5a accepts the data transported over the network 4. Out of the received data, the identification data extraction unit 5b extracts identification data being attached thereto. The unprotection unit 5c decodes, or unprotects, the received data, referring to the extracted identification data.

Now, the following section will describe how the system of FIG. 1 actually operates. Suppose, for example, that an operator is sitting at a terminal station (not illustrated in FIG. 1) that is coupled to the transmission unit 1. The operator now enters a request command to direct the transmission unit 1 to transfer some specific document data (e.g., design specification of a personal computer) from the storage units 1a and 3 to the reception unit 5. In response to this command, the data collection unit 1c sends a request to the data management unit 1b to retrieve the relevant data. In the present context, the data includes design specifications of motherboard, hard disk drive, and graphic card.

The data management unit 1b maintains data in the storage units 1a and 3 according to a logical hierarchy that organizes many data items. For example, the personal computer design specification mentioned above can be represented in the form of a hierarchical tree structure. This kind of data management tool used in the data management unit 1b is referred to as a "logical structure database." The data collection unit 1c makes access to this logical structure database to reach the intended data, which is located somewhere in the storage units 1a and 3. The data obtained in this way is supplied to the security processor 1d.

The security processor 1d extracts data confidentiality levels from the data supplied from the data collection unit 1c. More specifically, data items stored in the storage units 1a and 3 have their respective data confidentiality levels that indicate their importance. Naturally, more important data has higher confidentiality levels. The security processor 1d extracts this information and subjects each data item to a predetermined set of security protection processes relevant to the extracted data confidentiality level. For instance, the security processor 1d may simply compress and transmit data having a low confidentiality level, without using any other special protection techniques. In contrast to this, data having a high confidentiality level will be processed through an appropriately ordered combination of security measures, such as data encryption and authentication. In the latter case, data compression operations generally comes first, because such compression programs will not yield good data reduction ratios if the source data is encrypted. The individual security processes (e.g., data encryption, authentication, and compression) will hereafter be called "security process primitives."

The processed data is then supplied to the identification data attaching unit 1e. The identification data attaching unit 1e produces some additional information that indicates what sequence of security process primitives have been applied to the data. This information, referred to as "identification data," is fed to the transmitter 1f as an attachment of the data. The transmitter 1f sends out the security-protected data, together with its identification data, to the reception unit 5 over the network 4.

In the reception unit 5, the receiver 5a receives the data transported over the network 4 and supplies it to the identification data extraction unit 5b. Out of the received data, the identification data extraction unit 5b extracts the identification data for use in the unprotection unit 5c, along with the body of the reception data. The unprotection unit 5c first examines the identification data to recognize which security process primitives the transmission unit 1 selected and in what order it applied these primitives. The unprotection unit 5c then decodes the data by reversely tracing the sequence of security process primitives, thereby reconstructing the original data. When the identification data reveals, for example, that a data compression and encryption processes were applied by the transmission unit 1, the unprotection unit 5c can reproduce the original data by decrypting and then expanding the received data. The data decoded in this way is now saved into a storage unit (not illustrated in FIG. 1) integrated in, or coupled to, the reception unit 5. Accordingly, the recipient can browse the data displayed on a monitor screen.

Although the above explanation has assumed that the system applies different security processes to individual data items, the present invention is not restricted to that specific scheme. Alternatively, the system can be configured to process every data item with a unified set of security processes that is determined in accordance with the one having the highest confidentiality level.

As described above, the transmission unit 1 of the present invention is designed to execute the following steps in response to a data transmission request from an end user. First, the data collection unit 1c automatically collects the requested data, consulting a logical structure database stored in the data management unit 1b. Next, the security processor 1d applies a predetermined set of security process primitives to the collected data in appropriate order, according to its confidentiality level. The resultant security-protected data is then transmitted toward the reception unit 5, together with identification data that shows what sequence of security process primitives have been applied to the data. In the reception unit 5, the receiver 5a accepts the data arriving from the transmission unit 1. The identification data extraction unit 5b extracts the identification data out of the received data, enabling the unprotection unit 5c to remove the security protection that is guarding the data.

The present invention provides the following benefits. First, it liberates end users at the sending end from the burden of manual collection of transmission data. The feature of automatic data collection also ensures the authenticity of data, besides providing increased work efficiency. Second, the present invention automatically selects and applies appropriate security processes according to the confidentiality levels of individual data items, without being affected by the sender's personal view. This prevents important company information from leaking out, as well as standardizing the processes of security protection. Third, the present invention enables construction of a security system that does not depend on the skill levels of end users, since the system applies appropriate security processes to such data items whose confidentiality levels cannot be determined easily with the existing company rules or other written standards. Fourth, the present invention manages a plurality of security process primitives in an integrated way to alleviate workloads imposed on the individual users. When updating one security process primitive, it is only necessary to change a relevant setup in the transmission unit 1 to adapt the new version. Fifth, the present invention guarantees an optimum order of operations for any combinations of security process primitives, enabling the individual primitives to deliver their real performance. Lastly, according to the present invention, the system automatically executes security protection and unprotection processes with reference to the identification data, which is attached to the body of the data to show the combination and the order of process primitives executed. Besides negating the need for sending such information in a separate message, the present invention ensures data decoding operations by eliminating the chance of losing the record of applied security processes.

Figure 2:
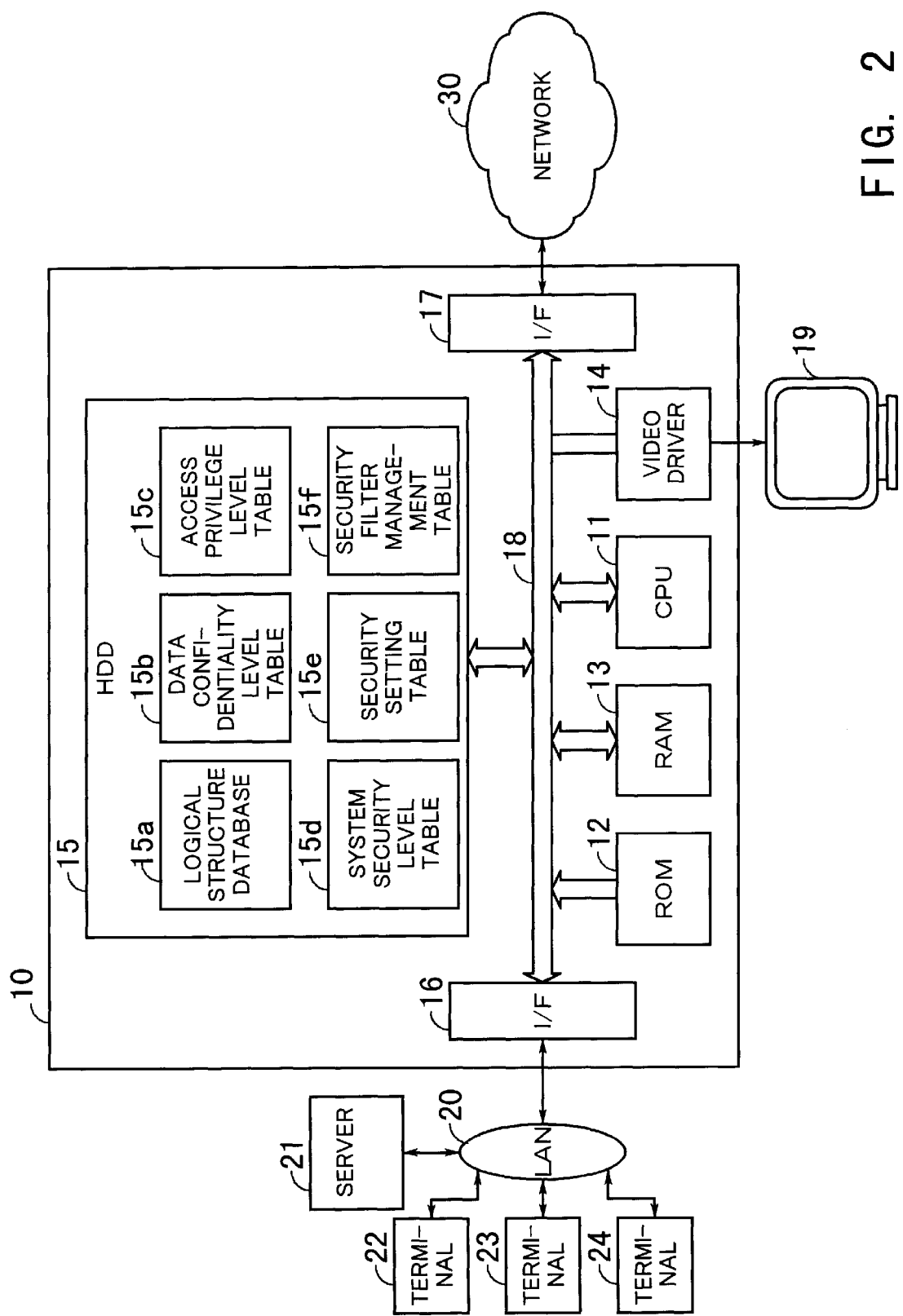
FIG. 2 is a block diagram of a transmission unit according to a first embodiment of the present invention.
Figure 3:
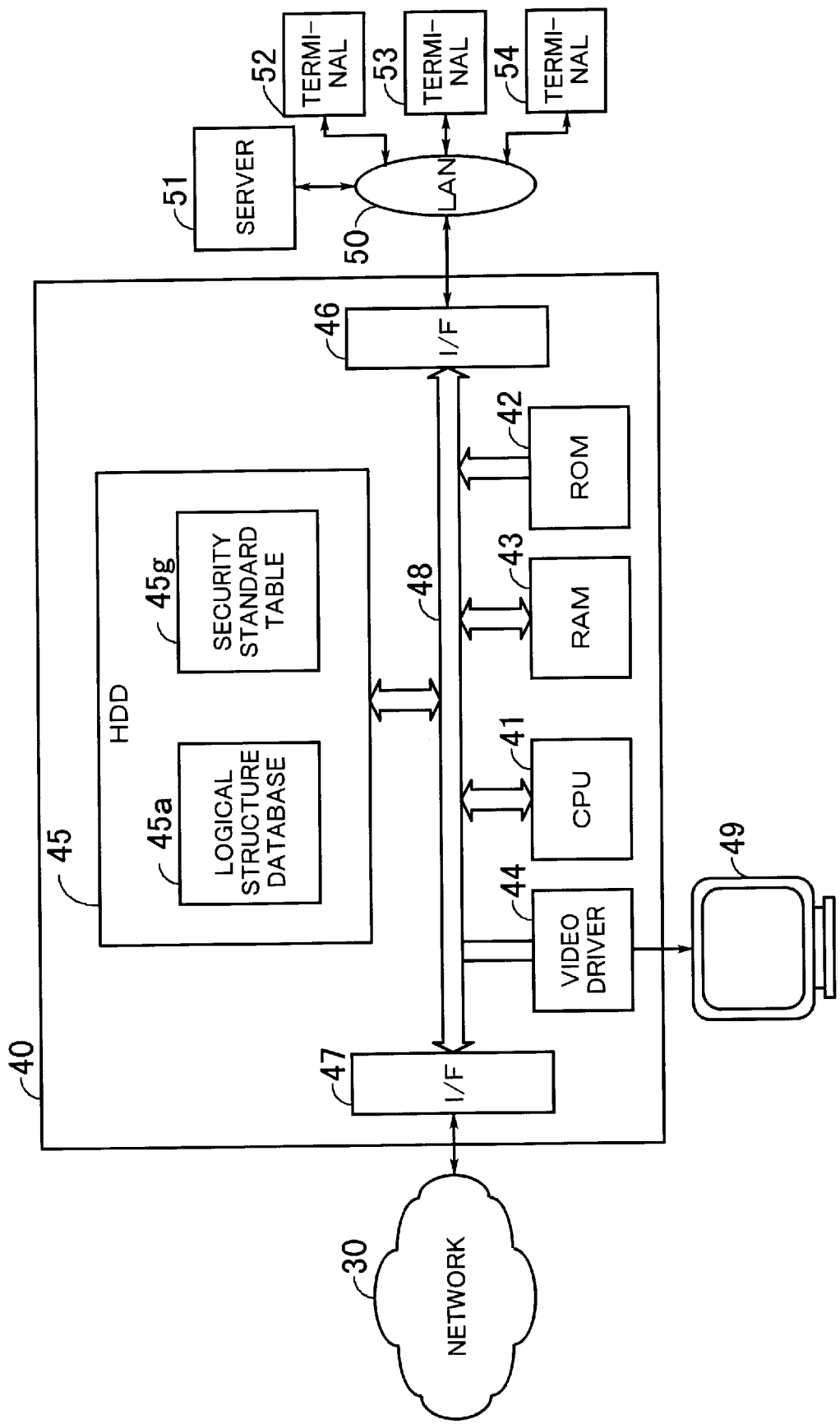
FIG. 3 is a block diagram of a reception unit according to the first embodiment of the present invention.

Referring next to FIGS. 2 and 3, the following section will present a first embodiment of the present invention.

FIG. 2 is a block diagram of a transmission unit 10 according to the first embodiment of the present invention. This transmission unit 10 handles a variety of data entered from terminals 22 to 24 in an integrated way. When a transmission request for specific data items is received from one of the terminals 22 to 24, the transmission unit 10 collects and transmits the requested data to a reception unit (described later) over a network 30. A monitor unit 19, comprising a video monitor device such as a cathode ray tube (CRT), displays images that the transmission unit 10 produces.

A local area network (LAN) 20, typically an Ethernet-based link, interconnects a server 21 and terminals 20 to 24, allowing them to communicate with each other. The server 21 has its local storage to hold various data, which can be retrieved and delivered to the terminals 22 to 24 via the LAN 20 in response to the queries from them. The server 21 also receives data from the terminals 22 to 24 and stores it into predetermined spaces of its local storage, via the transmission unit 10. With the terminals 22 to 24, end users can initiate transmission of their intended information to remote reception units. The end users also register new data to the server 21. Preferably, the network 30 is least lines, VANs, or open networks such as the Internet.

The next section describes a detailed configuration of the transmission unit 10.

The transmission unit 10 comprises a central processing unit (CPU) 11, a read-only memory (ROM) 12, a random access memory (RAM) 13, a video driver 14, a hard disk drive (HDD) 15, interfaces (I/F) 16 and 17, and a bus 18. The CPU 11 controls other internal units within the transmission unit 10 and executes various operations. The ROM 12 stores basic operating software (firmware) and miscellaneous data that the CPU 11 uses. The CPU 11 uses the RAM 13 as its temporary data and program storage when it performs various computational operations. The video driver 14 executes video commands supplied from the CPU 11, thus producing video signals to display images on the screen of the monitor unit 19.

The HDD 15 provides several data areas for database services and security control, including: a logical structure database 15a, a data confidentiality level table 15b, an access privilege level table 15c, a system security level table 15d, a security setting table 15e, and a security filter management table 15f. The HDD 15 further stores software programs of security process primitives.

Figure 4:
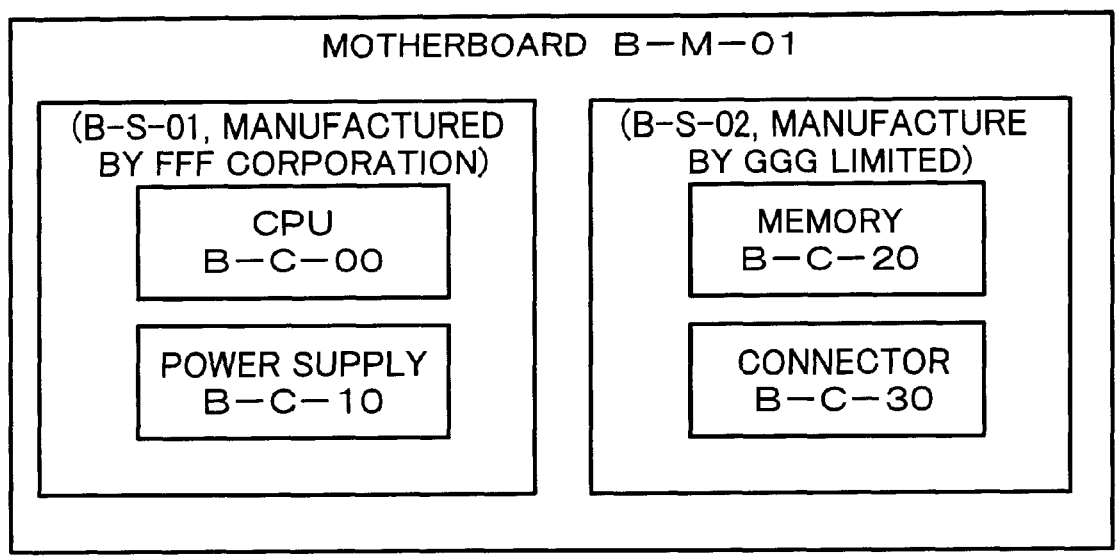
FIG. 4 is a diagram which shows an example of data stored in the transmission unit of FIG. 2.

The logical structure database 15a manages the data items stored in the server 21 and other locations (e.g., storage in the terminals 22 to 24), mapping them on a logical hierarchical structure. Take a motherboard configuration data of FIG. 4 for example. FIG. 4 shows that a personal computer's motherboard B-M-01 contains the following two components: a first component B-S-01 from a manufacturer "FFF Corporation," and a second component B-S-02 from another manufacturer "GGG Limited." The first component B-S-01 comprises a CPU B-C-00 and a power supply B-C-10, while the second component B-S-02 comprises a memory B-C-20 and a connector B-C-30.

Figure 5:
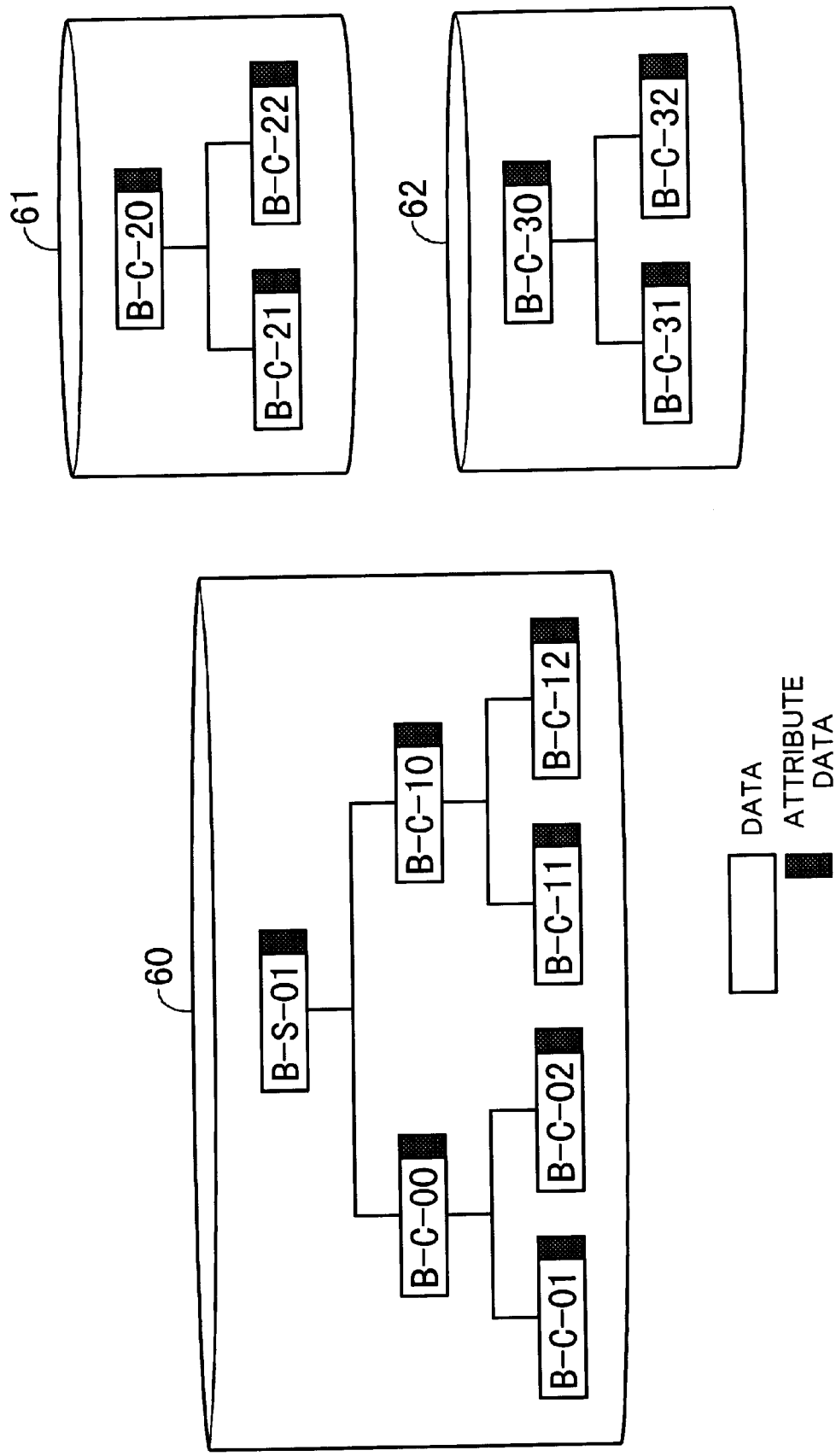
FIG. 5 is a diagram which shows an example of data stored in the storage unit shown in FIG. 2.

Suppose here that the design specification of a motherboard having the above component structure is stored in the server 21 and other places in a distributed manner. FIG. 5 depicts a situation where the data of the first component B-S-01 is stored in a storage unit 60 (e.g., the server 21's local storage), and the data of the second component B-S-02 is distributed in other storage units 61 and 62 (e.g., terminals 22 and 23). Although FIG. 4 does not show this level of information, the CPU (B-C-00) comprises components B-C-01 and B-C-02; the power supply B-C-10 comprise components B-C-11 and B-C-12; the memory B-C-20 comprises components B-C-21 and B-C-22; and the connector B-C-30 comprises components B-C-31 and B-C-32. In FIG. 5, small black boxes attached to each illustrated data item represent attribute information pertaining to the data. This attribute information contains, for example, the creation date and time, modification date and time, and data size.

Figure 6:
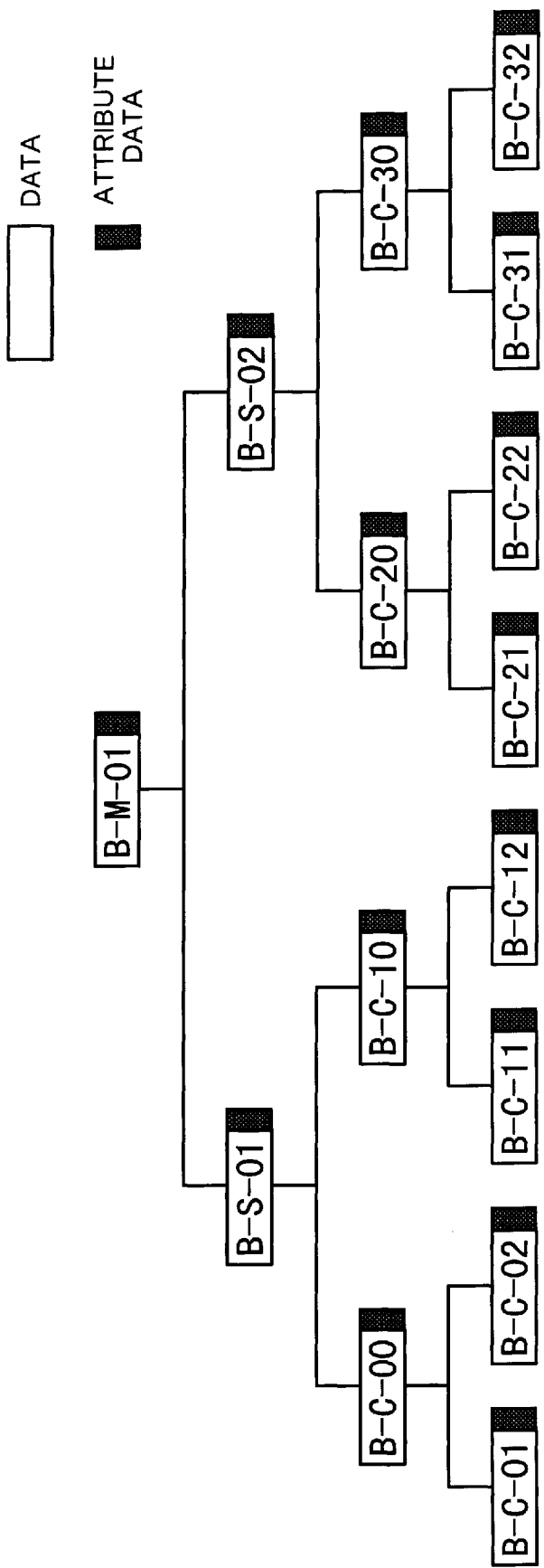
FIG. 6 is a diagram which shows an example of data stored in a logical structure database shown in FIG. 2.

While FIG. 5 illustrates the distributed locations of individual data items, FIG. 6 depicts their relationships in hierarchical form. Such structural information is stored in the logical structure database 15a. In FIG. 6, each individual data item is represented as a rectangular region, and each such region has a label showing its data name (e.g., B-M-01). The data names are also used as file names when the data items are saved in their relevant storage devices. A small black box attached to the end of each illustrated data item represents its attribute information, indicating which storage device stores this data and where the device is located.

As such, the logical structure database 15a maintains information about the interrelationships among a plurality of data items that are stored in physically separate locations, allowing the system to easily locate a particular set of data items. When a specific data item on an upper layer is designated, the system finds its relevant lower-layer items, as well as their respective storage locations, by simply tracing the hierarchical tree structure. Suppose, for example, that an end user has designated "B-C-10" as transmission data. Then the system automatically finds "B-C-11" and "B-C-12" as its relevant lower-layer information. Examining their attribute information, the system can identifies their respective storage locations.

The data confidentiality level table 15b (FIG. 2) stores confidentiality level of each stored data. FIG. 7 shows an example of such confidentiality level information. Here, documents of a specific personal computer (PC) include those of motherboard, HDD, and other components. Further, the motherboard documents consist of its design specifications, cost information, and production plan. In this example, the confidentiality level assigned to the motherboard specifications is "6," while those of the cost information and production plan information are "10" and "5," respectively. Note here that larger numbers indicate that the information is more important.

When storing data into the server 21 or other places, its data confidentiality level should be determined in accordance with its importance and entered into the data confidentiality level table 15b. This task is typically performed by a limited number of people, rather than by general end users, who are working as coordinators in each organizational unit, or who are assigned as the administrators of the transmission unit 10. The consistency should be maintained in this way, not to introduce different standards to the data confidentiality levels.

The access privilege table 15c (FIG. 2) stores information on the access privilege level of each recipient. FIG. 8 depicts the data structure of this table 15c, where different access privilege levels are assigned to different divisions of destination companies, depending on the products that they handle. For instance, "AA Division" in "FFF Corporation" has an identification (ID) code "01." One of its subordinate sections, in charge of PC products, is given an access privilege level of "1," while another section dealing with HDD products has "3." Entities having higher access privilege levels can make access to more important information in the source company.

The system security level table 15d (FIG. 2) stores information on the security level of each recipient system. FIG. 9 depicts a typical data structure of this table 15d, where different security levels are assigned to different divisions of recipient companies. The third to sixth columns of the table 15d show the security levels evaluated in the following four areas: network environment, system environment, operational environment, and overall environment. More specifically, the third column titled "Network Environment" indicates the levels of network security. For example, a leased-line-based network environment and an Internet-based environment will be given different values. The fourth column named "System Environment" shows the security level of computer systems being used, which may be general purpose computers, UNIX machines, or personal computers. The security level appearing in the fifth column "Operating Environment" is determined by an assessment as to whether the division of interest has, for instance, qualified technical stuff or well-defined rules describing their system operations policies. Lastly, the sixth column "Overall Environment" shows the average point of the above three kinds of security levels, which is referred to as the "system security level."

Take AA Division of FFF Corporation for example. The security level of their network environment is 6, and their system environment and operating environment are ranked 7 and 5, respectively. Accordingly, the security level of their overall environment is calculated as follows.

(6+7+5)/3=6

Here, larger overall environment values indicate that the system of interest is deemed to be more secure in terms of total performance.

As another configuration, the system can use weighting functions, instead of simple averages. That is, the above three kinds of security level values are respectively multiplied by three predetermined weighting coefficients, and the sum of the resulting products is used to evaluate the system's overall security level. This configuration improves the accuracy of security evaluation since it more precisely reflects the influence of each environment.

The security setting table 15e (FIG. 2) assigns appropriate "filters" to different classes of security environments. Here, the term "filter" denotes a combination of a plurality of security process primitives arranged in an optimal order. FIG. 10 shows this security setting table 15e, where eight kinds of filters are associated with different ranges of the following three parameters: data confidentiality level $\alpha$, access privilege level $\beta$, and system security level $\gamma$.

The principle of this security setting table 15e is as follows. Consider a coordinate system having three orthogonal axes $\alpha$, $\beta$, and $\gamma$. In terms of security levels, a data item to be transmitted to a specific recipient can be mapped to a point in this three-dimensional coordinate space. Recall that data items having higher data confidentiality levels $\alpha$ are of greater importance. It should therefore be understood that more stringent security protection is required when processing data items positioned far from the $\beta$-$\gamma$ plane. Likewise, a larger access privilege level $\beta$ means that the recipient company is more reliable, since it proves the right to make access to the sender's confidential information. Stated in reverse, more stringent security processes are required when sending data to such recipients that are positioned far from the $\alpha$-$\gamma$ plane. Further, recipient companies having higher system security levels $\gamma$ are deemed to be more reliable, meaning that more stringent security protection should be applied to transmission data when sending it to such recipients that are positioned close to the $\alpha$-$\beta$ plane. When a specific data item and its destination are designated, the system determines which security processes (or filter) to apply, according to its position in the $\alpha$-$\beta$-$\gamma$ coordinate system. This method promises an optimal selection of security measures for the given data item.

The security setting table 15e of FIG. 10 has been formulated by: (1) dividing a given domain of the $\alpha$-$\beta$-$\gamma$ space into eight independent (i.e., non-overlapping) sub-domains, and (2) defining one filter for each of the eight sub-domains so that it will provide optimal performance in that particular sub-domain. The table 15e of FIG. 10 means, for example, that the filter No. 1 will be selected when the following conditions are met.

$$\begin{cases} \text{data confidentiality level } \alpha: & 1 \le \alpha < 5 \\ \text{access privilege level } \beta: & 2 < \beta \le 6 \\ \text{system security level } \gamma: & 2 < \gamma \le 6 \end{cases}$$

It should be noted here that the security setting table 15e of FIG. 10 gives no suggestion of filter numbers for $\alpha \ge 9$, $\beta \le 2$, or $\gamma \le 2$, although the domain is defined as $1 \le \alpha, \beta, \gamma \le 10$. As a matter of fact, the values of $\alpha$, $\beta$, and $\gamma$ in such ranges suggest that the system is unable to provide sufficient security measures. If this is the case, the system will immediately deny the requested data transmission because of the lack of security.

The security filter management table 15f (FIG. 2) is used to manage the parameters of each filter. FIG. 11 presents a specific example of this table 15f, which defined the kinds of security process primitives included in each filter, together with the order of their execution. Alphabetical symbols "a" to "f" represent different kinds of security process primitives (e.g., authentication, signature), whose definitions are listed in a table of FIG. 12. Some security process primitives have options as shown in the column titled "No." of the same table. The process category "e," for example, has four options (LHA, COMPRESS, GZIP, and FLDC) for data compression algorithms, which are designated by the numbers "1" to "4."

The next section will now describe the configuration of a reception unit according to the first embodiment of the present invention.

FIG. 3 is a block diagram of a reception unit 40 according to the first embodiment of the present invention. This reception unit 40 receives data from the transmission unit 10 via the network 30 and distributes the received data for use or storage in its local system, which includes a server 51 and a plurality of terminals 52 to 54 being interconnected by a LAN 50.

The hardware configuration of the reception unit 40 is similar to that of the transmission unit 10 described earlier. More specifically, it comprises a CPU 41, a ROM 42, a RAM 43, a video driver 44, an HDD 45, interfaces 46 and 47, and a bus 48, which work in the same way as those in the transmission unit 10 of FIG. 2. Also, a monitor unit 49, which is a peripheral of the reception unit 40, corresponds to the monitor unit 19 of FIG. 2. The reception unit 40, however, is distinguishable from the transmission unit 10 in that its HDD 45 holds a different kind of data table. That is, the HDD 45 contains a security standard table 45g, while not having a data confidentiality level table 15b, an access privilege level table 15c, a system security level table 15d, a security setting table 15e, or a security filter management table 15f, which are found in the HDD 15 of the transmission unit 10. When a data packet is received from the transmission unit 10, the CPU 41 extracts filter number information that has been attached to the body of the data. With this filter number information, it then consults the security standard table 45g to determine by what combination and sequence of security process primitives the received data is protected.

Figure 13:
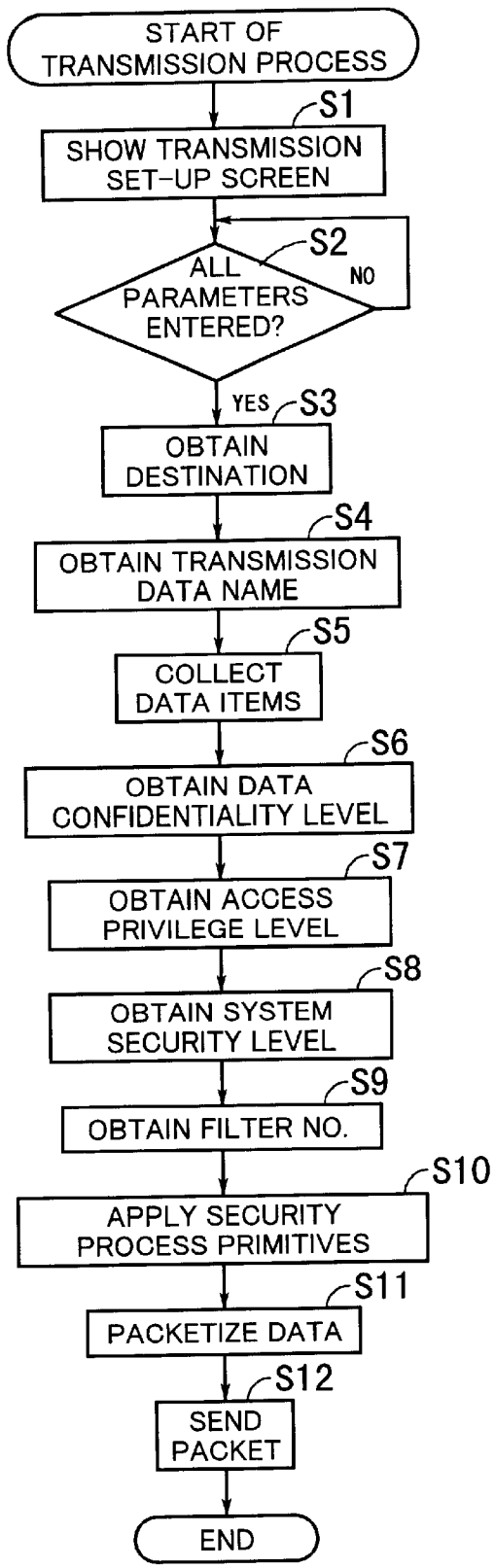
FIG. 13 is a flowchart which shows a data transmission process to be executed by the transmission unit according to the first embodiment.

Referring next to FIG. 13, the following section will present the operation of the transmission unit 10 shown in FIG. 2. FIG. 13 is a flowchart showing how the transmission unit 10 of the first embodiment executes a data transmission process. When initiated, the process advances according to the following steps.

Figure 14:
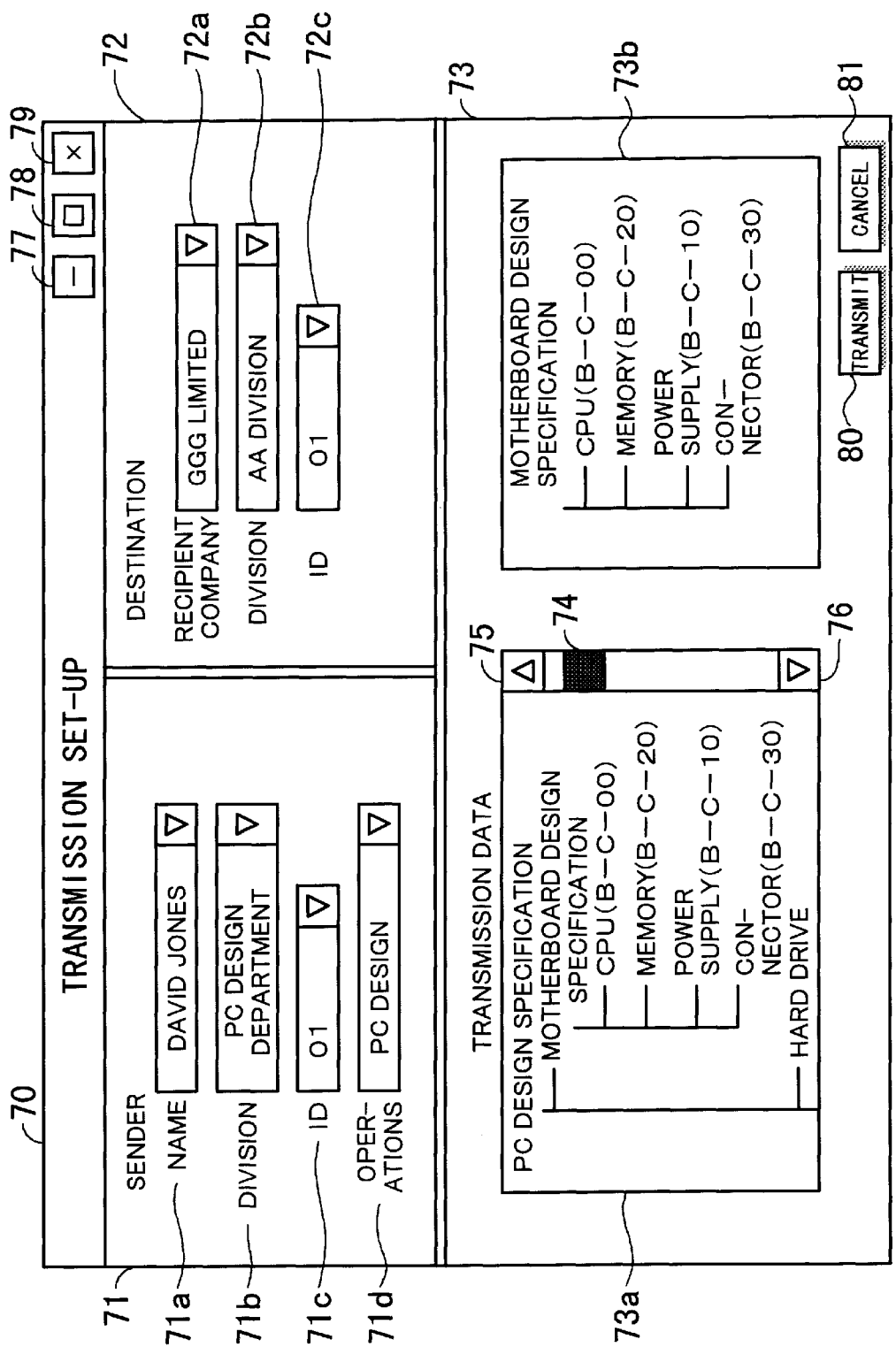
FIG. 14 is a diagram showing a typical window which appears on a monitor screen when the data transmission process described in the flowchart of FIG. 13 is executed.

(S1) The CPU 11 sends a predetermined command to the video driver 14 to display a transmission set-up screen on the monitor unit 19. FIG. 14 shows a typical layout of this transmission set-up screen. The screen includes a dialog box 70 titled "Transmission Set-up," which is divided into: a data sender setting pane 71, a data destination setting pane 72, and a transmission data setting pane 73. Buttons 77, 78, and 79 at the upper right corner of the transmission set-up screen 70 are used to minimize or maximize the box, or to close the dialog. The dialog box 70 has a SEND button 80 to initiate a data transmission process with the parameters entered in this screen, and a CANCEL button 81 to clear the entered parameters and cancel the transmission. These two buttons 80 and 81 are located at the bottom right corner of the dialog box 70.

In the data sender setting pane 71, four drop-down combo boxes 71a to 71d are arranged to allow the sender to enter the name of his/her own, and the name, identification code, and operations of an organizational unit to which he/she belongs. The data destination setting pane 72, on the other hand, has three drop-down combo boxes 72a to 72c, allowing the sender to enter the recipient company name, as well as the name and identification code of the recipient division.

In the transmission data setting pane 73, there are provided a list box 73a and an edit box 73b. The list box 73a displays a tree structure that represents all candidate data being available for transmission. This tree structure is formulated from the data stored in the logical structure database 15a. A vertical scroll bar, which contains a scroll box 74 and scroll arrows 75 and 76, is placed on the right-hand edge of the list box 73a, permitting the sender to browse through the list of data items. When he/she selects a specific data item from the list box 73a, the contents of the selected transmission data will appear in the edit box 73b.

(S2) The CPU 11 checks whether the sender has finished the entry of parameters. The process advances to step S3, when all necessary parameters are entered in the transmission set-up screen of FIG. 14, and when the SEND button 80 is pressed. Otherwise, the CPU 11 executes this step S2 again.

(S3) The CPU 11 acquires information regarding the data destination, which has just been entered by the sender in the transmission set-up screen of FIG. 14. Since "AA Division" of "GGG Limited" has been designated as the recipient in the present context, the CPU 11 receives these names, along with the recipient's ID code "01."

(S4) The CPU 11 then fetches the name of the transmission data designated in the transmission set-up screen of FIG. 14. In the present context, the transmission data name is "Motherboard Design Specification," which is found in the edit box 73b.

(S5) Referring to the logical structure database 15a, the CPU 11 collects data items that are relevant to the transmission data name obtained at step S4, by searching the server 21 or other storage units if appropriate. In the present example of FIG. 14, several data items relating to the Motherboard Design Specification are collected from a plurality of storage units, as described earlier in FIG. 5.

(S6) The CPU 11 obtains data confidentiality levels of the collected data items by consulting the data confidentiality level table 15b. As FIG. 7 shows, the Motherboard Design Specification has a data confidentiality level of "6."

(S7) Referring next to the access privilege level table 15c, the CPU 11 obtains the access privilege level of the recipient. As FIG. 8 indicates, the recipient (AA Division of GGG Limited) has an access privilege level of 2.1 in the present context.

(S8) The CPU 11 then obtains the system security level of the recipient, consulting the system security level table 15d. As FIG. 9 shows, the recipient has a system security level of 2.1 in the present case.

Figure 15:
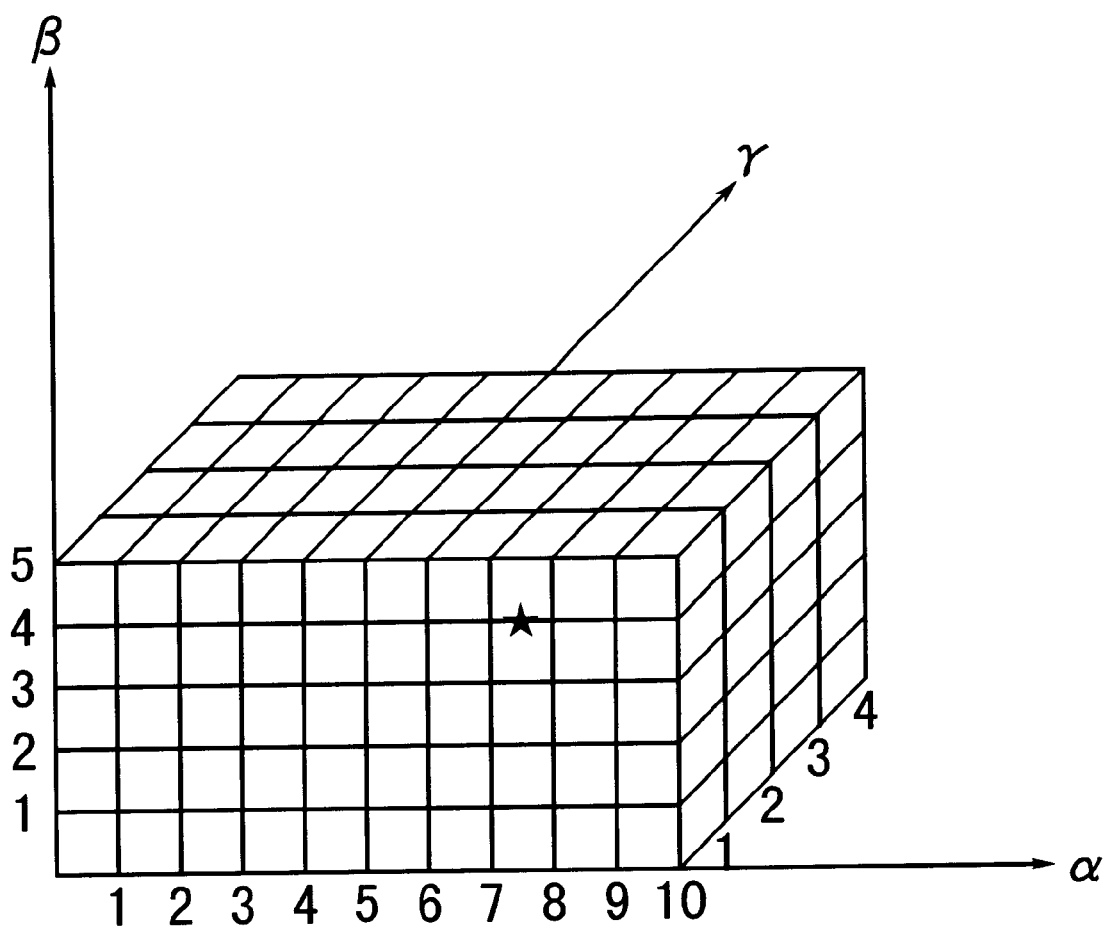
FIGS. 15 and 16 are diagrams which explain the principle of a security setting table shown in FIG. 2.
Figure 16:
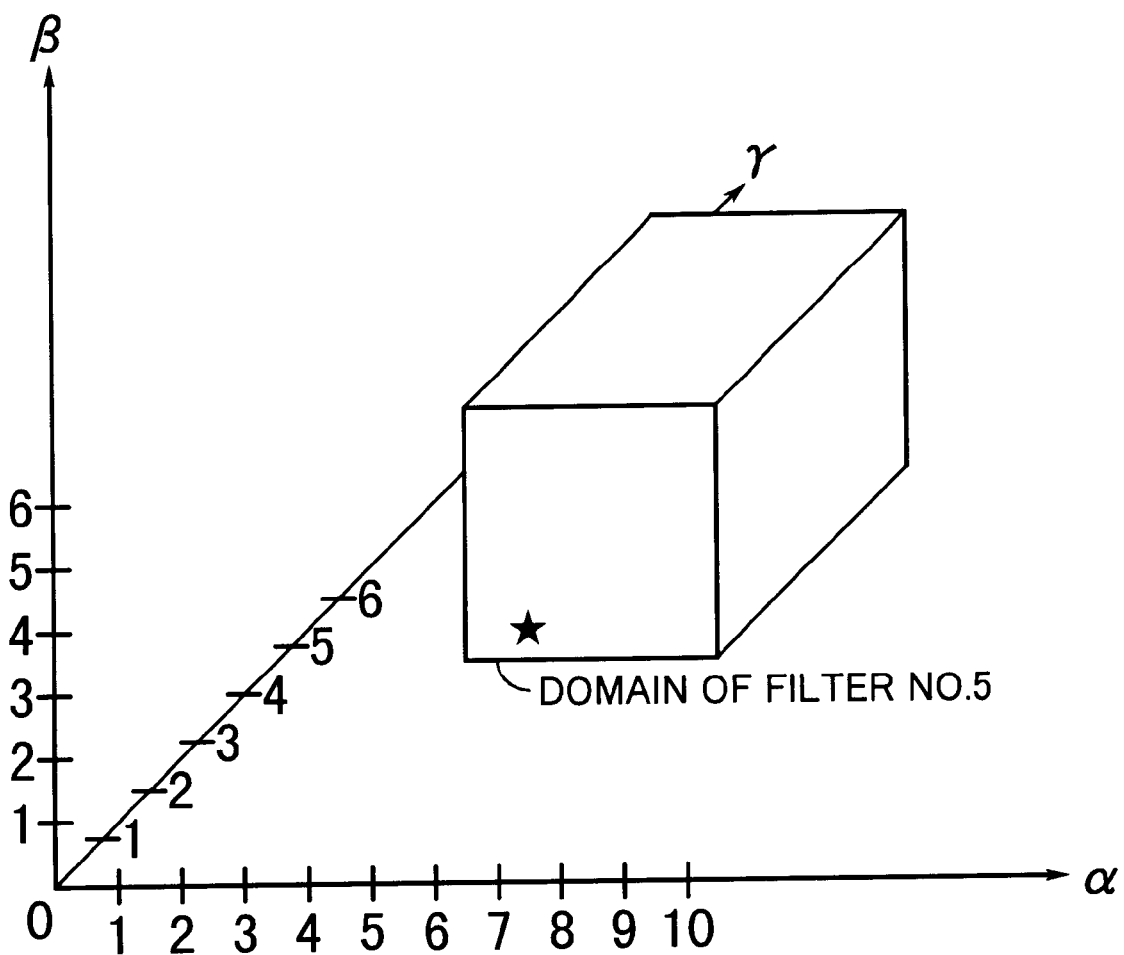

(S9) Based on the data confidentiality level $\alpha$, access privilege level $\beta$, and system security level $\gamma$ obtained at steps S6 to S8, the CPU 11 determines which filter to use. In the present context, the data confidentiality level $\alpha$ a is 6; the access privilege level $\beta$ is 2.1; and the system security level $\gamma$ is 2.1. This situation can be represented by a symbol "★" plotted in the $\alpha$-$\beta$-$\gamma$ coordinate system as shown in FIG. 15. Note that the symbol "★" resides within a sub-domain that is defined by the fifth entry of the security setting table 15e, which reads as follows.

$$5 \leq \alpha < 9,\ 2 < \beta \leq 6,\ 2 < \gamma \leq 6$$

Therefore, the CPU 11 determines "Filter No. 5" as a suitable operator.

(S10) The CPU 11 applies the filter (i.e., security processes) obtained at step S10 to each data item collected at step S5. Since Filter No. 5 has been obtained at step S9, the CPU 11 searches the security filter management table 15f (FIG. 11) to find an entry that gives the process details of Filter No. 5. In this context, the CPU 11 identifies a series of security process primitives including: a-1, b-2, e-1, and f-1. As FIG. 12 shows, these four symbols denote "PC-CARD," "MD5," "LHA," and "DES" operators, respectively. The CPU 11 applies these operators to the data collected at step S5, while fetching their software routines from the HDD 15 in the defined order.

Figure 17:
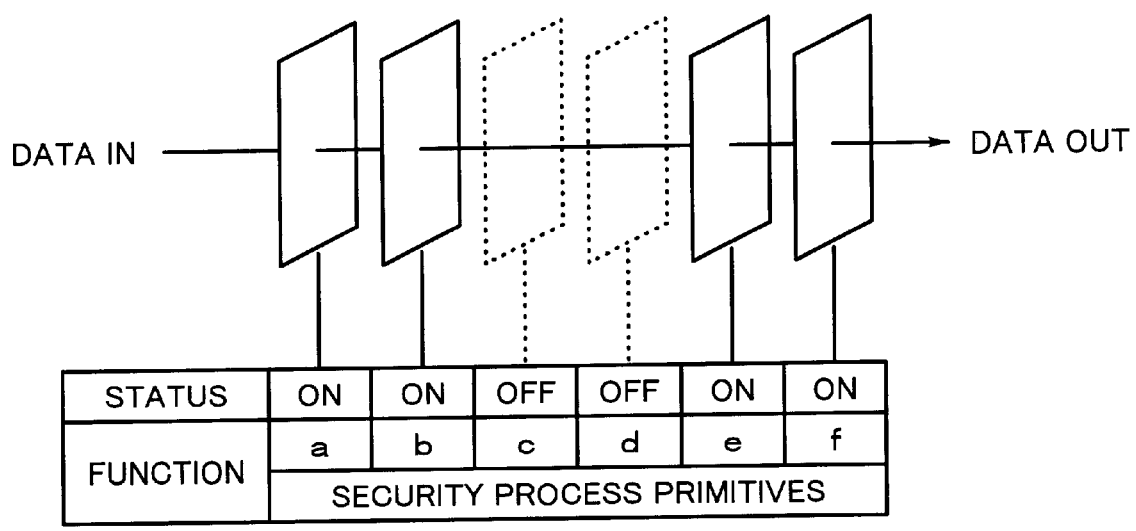
FIG. 17 is a diagram which explains the principle of security protection processes executed in the first embodiment.

FIG. 17 schematically shows the above process flow, where Filter No. 5 activates four functions a, b, e, and f, and deactivates the other two functions c and d. Transmission data is manipulated with the activated security process primitives a-1, b-2, e-1, and f-1, during its travel from the left to the right of FIG. 17. As described above, these primitives are arranged in an optimal order, making it possible to apply the required level of data protection efficiently and effectively.

Figure 18:
FIG. 18 is a diagram which shows a typical structure of transmission data to be sent by the transmission unit of the first embodiment.

(S11) The CPU 11 supplies the interface (I/F) 17 with the security-protected data in order to packetize the information. FIG. 18 illustrates a packetized data message. In this example, the security-protected data 96 is preceded by some additional information fields including: a header field 90, a source address field 91, a destination address field 92, a data name field 93, a transmission date and time field 94, and a filter number field 95. The header field 90 contains information indicative of what communication protocols are used and what type of data is enclosed in the packet. The source and destination address fields 91 and 92 convey the names of the sender and recipient. The data name field 93 indicates the title of the security-protected data 96. The transmission date and time field 94 contains a time record of the transmission of this packet. The filter number field 95 shows which filter has been used to protect the data.

(S12) Finally, the interface 17 transmits the data packet to the reception unit 40 over the network 30, thus concluding the above process of data transmission.

The above-described data transmission has assumed that all data items have the same confidentiality levels. In actuality, however, it can happen that some data items have different confidentiality levels from other's. The next section will discuss the latter situation.

Figure 19:
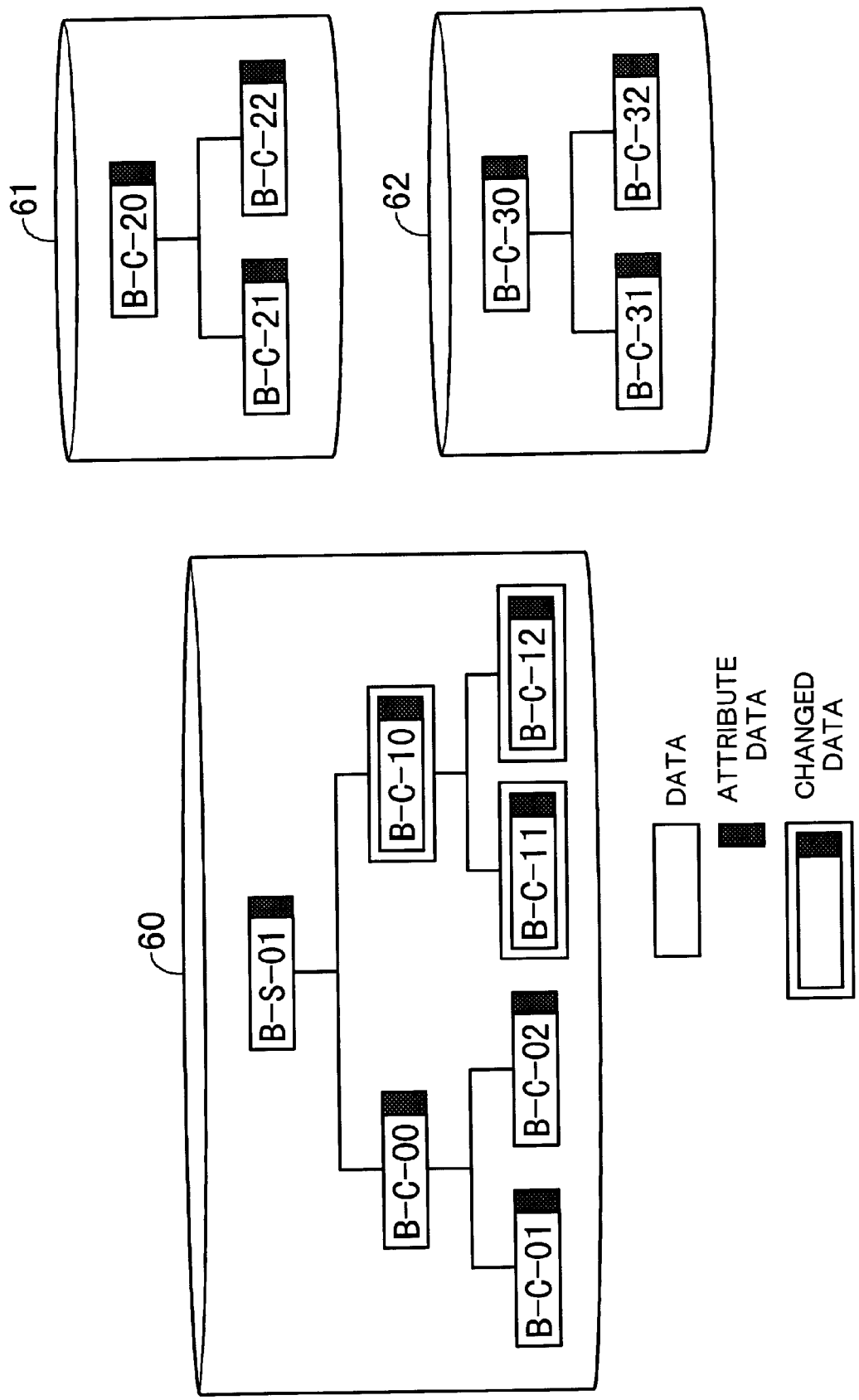
FIG. 19 is a diagram which shows a situation where the data shown in FIG. 5 is partly changed.
Figure 20:
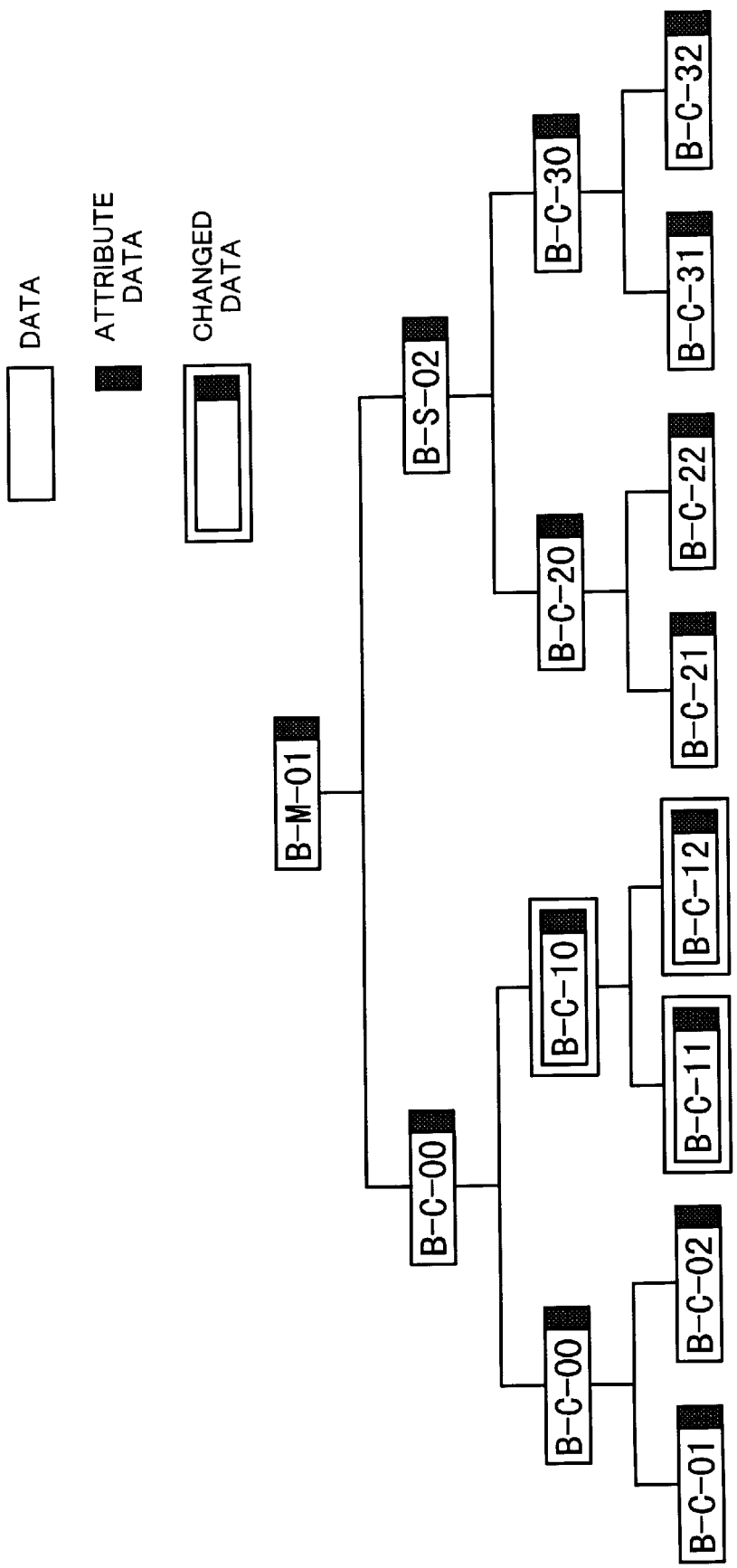
FIG. 20 is a diagram which shows the logical structure of the data of FIG. 19.

Referring back to FIG. 5, a plurality of storage units maintain the design data of a personal computer in a distributed manner. Suppose here that the confidentiality level of power supply data B-C-10 is changed from "6" to "1." FIG. 19 depicts this situation, where the data stored in the storage unit 60 is partly modified with respect to its attribute information representing confidentiality levels, as indicated by double border lines. Further, FIG. 20 shows the same from the viewpoint of hierarchical structure of the stored data, which also uses double border lines to indicate data having a new confidential level. The above change in the power supply design data affects the data confidentiality level table 15b as FIG. 21 indicates. Compared to FIG. 7, this new arrangement of the table 15b has introduced a detailed structure of the document "Design Specifications" to deal with the new confidentiality level "1" of the power supply data.

Figure 22:
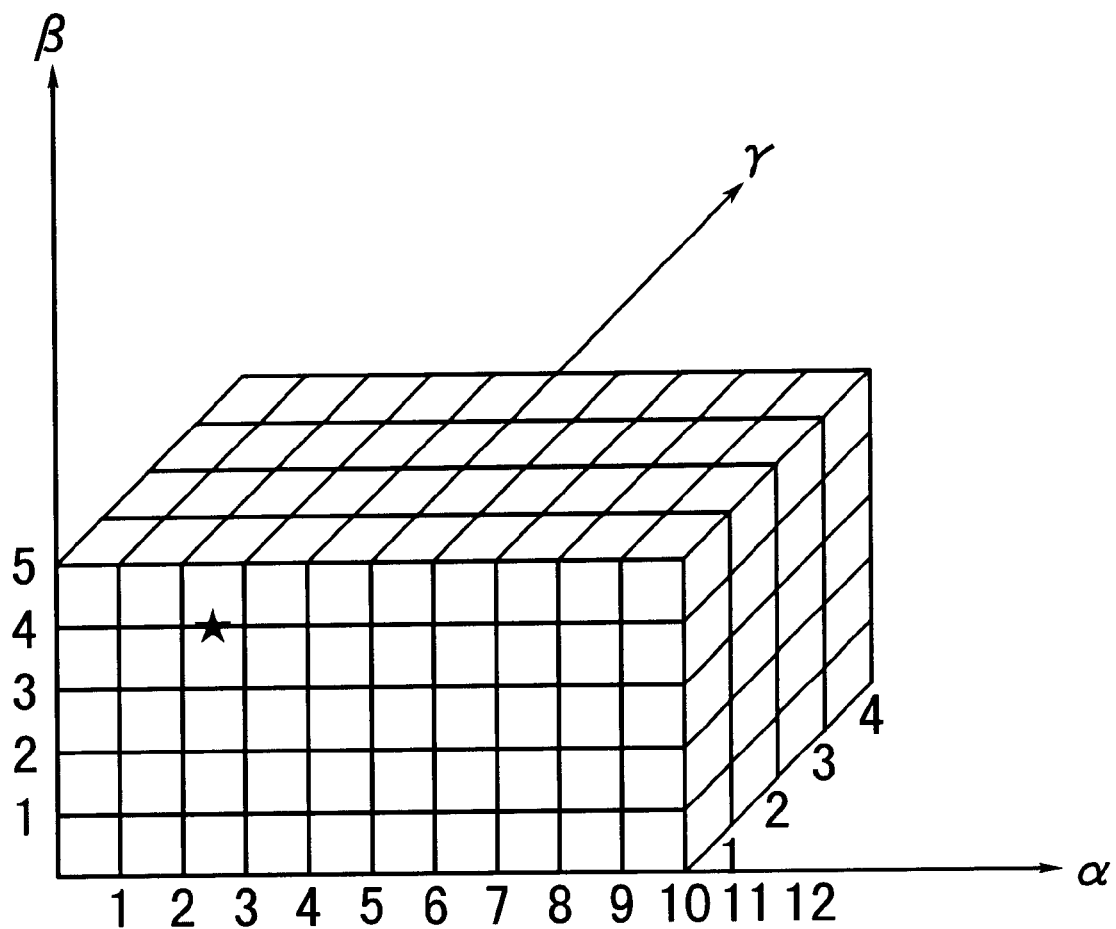
FIGS. 22 and 23 are diagrams which explain the principle of a security setting table shown in FIG. 2.
Figure 23:
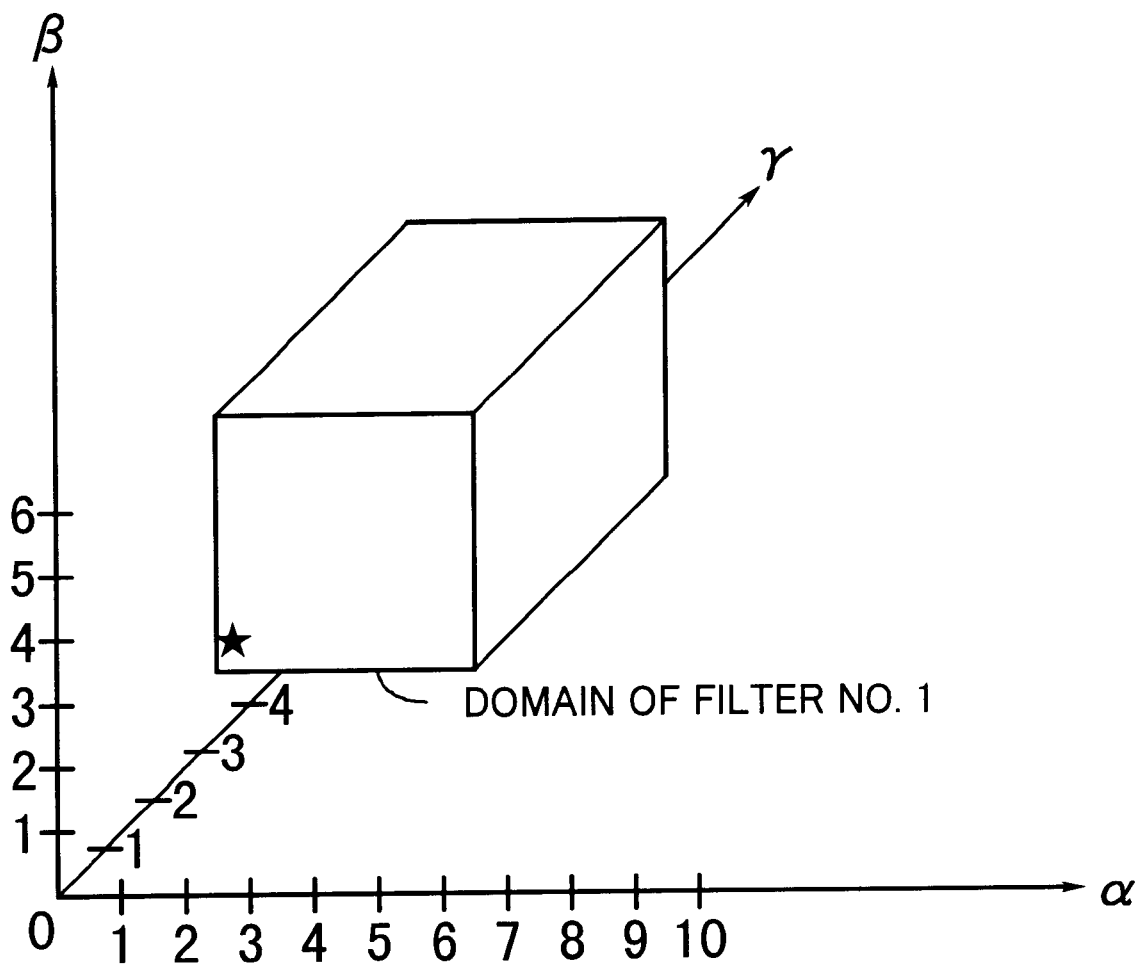

When protecting the above-described PC design specification, data items "CPU," "Memory," and "Connector" can be processed in the same way as described earlier, since they are unchanged. On the other hand, the data item "Power Supply" in question has a new position in the $\alpha$-$\beta$-$\gamma$ coordinate space, because its confidentiality level has been changed from "6" to "1." Its coordinate values ($\alpha$, $\beta$, $\gamma$) are now (1, 2.1, 2.1), which is indicated by a symbol "★" in FIG. 22. This new coordinate point is within a sub-domain of ($1 \leq \alpha < 5$, $2 < \beta \leq 6$, $2 < \gamma \leq 6$), to which the Filter No. 1 is mapped. Accordingly, the CPU 11 selects Filter No. 1 when it executes step S9 in the flowchart of FIG. 13. Subsequently, at step S10, the CPU 11 applies security processes to "Power Supply" according to the definition of Filter No. 1, while processing "CPU," "Memory," and "Connector" according to the definition of Filter No. 5. More specifically, Filter No. 1 consists of two security functions "a" and "d" (see FIG. 11), which are an authentication process "PC-CARD" and an anti-virus application "VACCINE," respectively (see FIG. 12).

Figure 24:
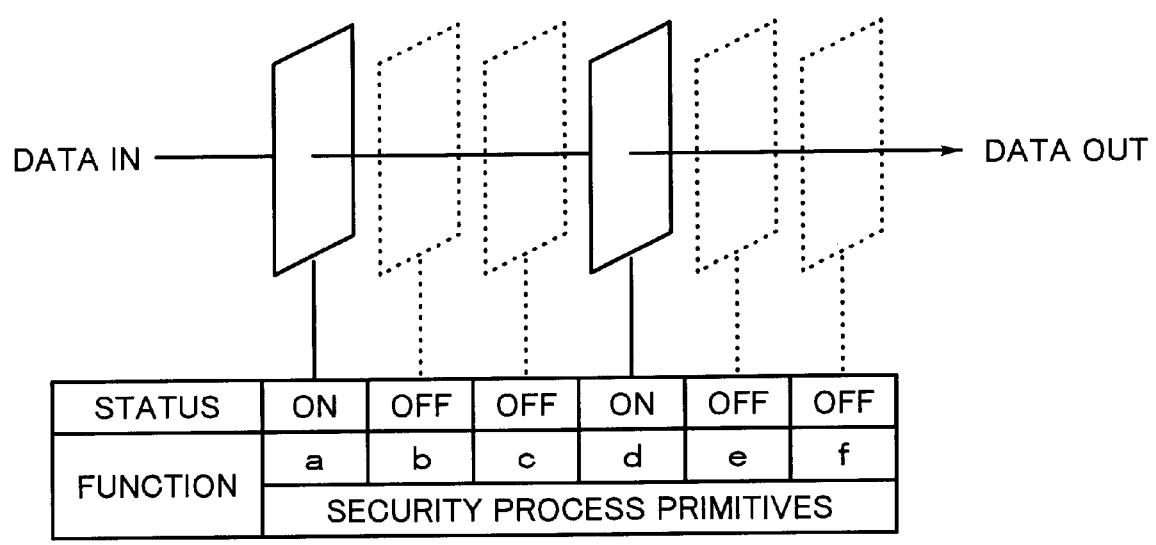
FIG. 24 is a diagram which explains the principle of security protection processes executed by the transmission unit of FIG. 2.

The above setup results in a security protection procedure illustrated in FIG. 24. Here, only two security process primitives "a" and "d" are activated while the others are inactive. The data entered from the left-hand side of FIG. 24 is processed with the security functions "a" (i.e., "PC-CARD") and "d" (i.e., "VACCINE"), and the resultant security-protected data is then fed to the interface 17 for packetizing. It should be noted that the packet will have two separate instances of the filter number field 95 (FIG. 18), one for "Power Supply" and the other for the rest. The former filter number field contains a value of "1," and the latter field "5."

As described above, the proposed system is designed to transmit combined data items with mixed confidentiality levels, after applying different security processes optimized to them. Data confidentiality levels never be permanent, but can be modified according to a change in the company's security rules or other reasons. The proposed system can cope with such changes by simply updating the data confidentiality level table 15b. New configuration will immediately take effect in the subsequent data security processing, only imposing a small amount of workload on the end users. Besides, the system prevents the company's confidential information from leaking out.

Now, the next section will describe how the security-protected data is received and decoded by the reception unit 40 in the present invention.

Figure 25:
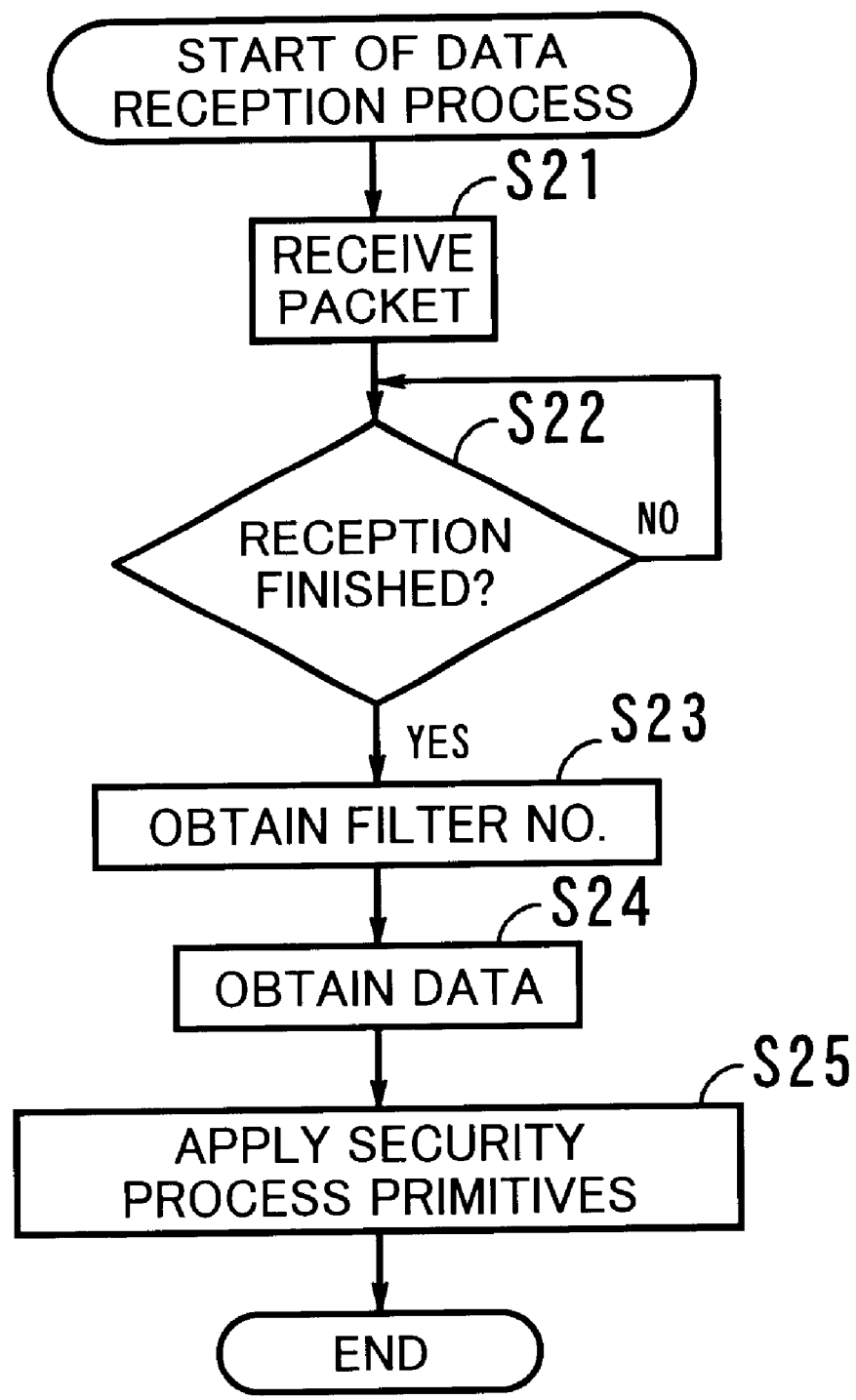
FIG. 25 is a flowchart which shows a process executed by the reception unit of FIG. 3 when receiving data.

FIG. 25 is a flowchart which shows a process executed by the reception unit 30 of FIG. 3 to receive data. Once invoked, the process advances according to the following steps.

(S21) The interface 47 accepts packets sent from the transmission unit 10 over the network 30. Each received packet is saved into the RAM 43 or HDD 45.

(S22) The CPU 41 checks whether the present packet reception has finished. The process advances to the next step S23, if it is finished. Otherwise, the CPU 41 executes this step S22 again.

(S23) From the received packet, the CPU 41 identifies which filter has been used to protect the source data.

(S24) The CPU 41 extracts the body of the transmission data from the received packet.

(S25) Referring to the security standard table 45g, the CPU 41 obtains the details of the filter that was identified at step S23. It then applies relevant security process primitives in appropriate order, thereby unprotecting the transmission data. More specifically, the security standard table 45g contains information illustrated in FIGS. 11 and 12, which tells the CPU 41 which security process primitives are included and in what order they are arranged in the filter. Now that the underlying security process primitives are all revealed, the CPU 41 applies their respective inverse operators to the received data in the reverse order, thereby reconstructing the original data. Suppose, for example, that the data is protected with Filter No. 5. In this case, the CPU 41 executes "DES," "LHA," "MD5," and "PC-CARD" processes in sequence, to decode data. The resultant unprotected data is temporarily saved into the HDD 45, during which the recipient can browse it with a monitor unit 49.

Now, the following section will explain a process to be executed by the transmission unit 10 when modifying the security setting table 15e.

Figure 26:
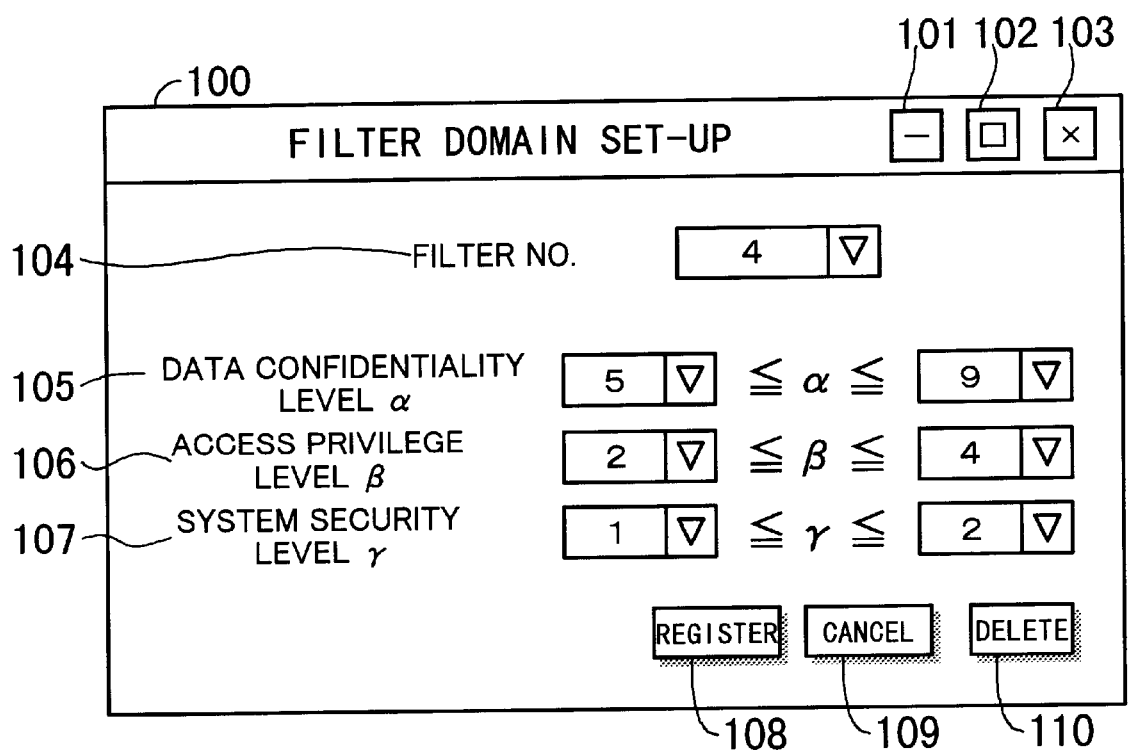
FIG. 26 is a diagram which shows a typical screen for setting up a security setting table shown in FIG. 2.

FIG. 26 shows a typical setting screen to define the security setting table 15e used in the transmission device 10 of FIG. 2. This screen has a dialog box 100 titled "Filter Domain Set-up." Buttons 101, 102, and 103 at the upper right corner of the dialog box 100 are used to minimize or maximize the box or to close the dialog.

At the top of the main area, there is provided a drop-down combo box 104 with a title "Filter No." Clicking a drop-down arrow on the right-hand side of the box 104 opens a list of filter numbers, out of which the user can choose a filter to be modified. FIG. 26 specifically shows that a value of "4" is specified as the filter number of interest.

Further, the dialog box 100 has a data confidentiality level setting line 105 to set a range of data confidentiality level $\alpha$. FIG. 26 shows two drop-down combo boxes to enter the lower limit and the upper limit of $\alpha$, which allows the user to type or select his/her choice by manipulating these combo boxes. In the present example, the upper and lower limits are "9" and "5," respectively. Similarly, an access privilege level setting line 106 and a system security level setting line 107 allow the user to enter the ranges of β and γ, respectively. The user can also change the inequality signs to make the boundary values inclusive or exclusive. For example, each click on an inequality sign will cause it to toggle between "≦" and "<," allowing the user to set the desired signs.

In this setting screen, however, the user may happen to give a contradictory definition such as overlapping α-β-γ sub-domains. To prevent this type of errors, the system can optionally generate a warning message or reject the entered values.

When all parameters are entered, the user clicks a REGISTER button 108 to save them into the security setting table 15e. Actually, the CPU 11 transfers the parameters to a predetermined area of the security setting table 15e, which occupies part of the HDD 15. If the user presses a CANCEL button 109, the system will cancel the entered parameters and restores the present values read out of the security setting table 15e. With a DELETE button 110, the user can erase a specific entry of the security setting table 15e that is specified by the value in the filter number combo box. The above-described facilities permit the user to define and modify the table 15e as demanded.

The next section will now present a process executed by the transmission unit 10 when modifying the security filter management table 15f.

Figure 27:
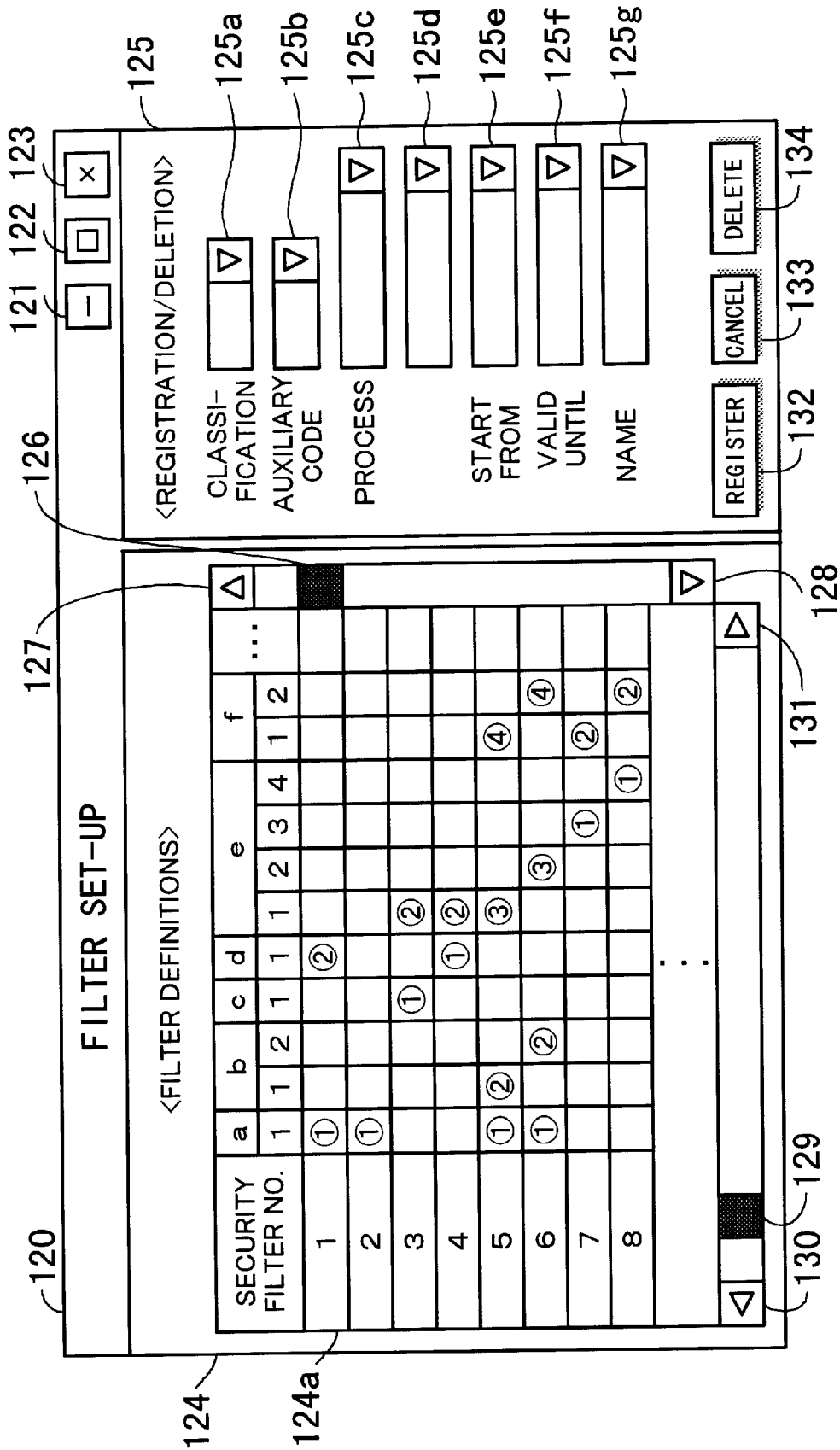
FIG. 27 is a diagram which shows a typical screen for setting up a security filter management table shown in FIG. 2.

FIG. 27 shows a typical screen that will be called up when a user changes the security filter management table 15f used in the transmission unit 10 of FIG. 2. This screen has a dialog box 120 titled "Filter Set-up." Buttons 121, 122, and 123 at the upper right corner of the dialog box 120 are used to minimize or maximize the box or to close the dialog. The dialog box 120 consists of two panes: a filter definition pane 124 with a title "Filter Definition" and a filter registration pane 125 with a title "Registration."

The filter definition pane 124 shows the contents of the security filter management table 15f in a viewing area 124a. This viewing area 124a is furnished with a vertical scroll bar with a scroll box 126 and scroll arrows 127 and 128 on its right-hand side, and a horizontal scroll bar with a scroll box 129 and scroll arrows 130 and 131 on its bottom. The operator manipulates these scrolling facilities to browse through the table contents, and if necessary, he/she can enter new parameter values or delete existing parameter values.

The filter registration pane 125 is designed to set the details of each security process primitive. More specifically, the type of a security process primitive (e.g., authentication, signature, compression) is entered into a first drop-down combo box 125a with a title "Classification." A second combo box titled "Auxiliary Code" accepts an integer number (e.g., 1, 2, 3, . . . ) to distinguish between subclasses of each security process primitive. The auxiliary codes correspond to what are found in the column "No." of FIG. 12. A third combo box 125c with a title "Process" is used to enter the name of a specific operator (PC-CARD, MD5, W-MARK, etc.) that serves as a security process primitive. A fourth combo box 125d provides a space for additional information regarding the security process. A fifth combo box 125e with a label "Start From" allows the user to set the date and time (e.g., "Aug. 10, 1999, 10:00 a.m.") at which the security process primitive starts to operate. A sixth combo box 125f labeled "Valid Until" is used to enter the time limit (e.g., "Aug. 10, 2001, 10:00") of the security process primitive. Lastly, a seventh combo box 125g with a title "Name" accepts the name of the user (e.g., "David Jones") who is attempting to register this security process primitive.

In order to register the entered parameters as a new primitive definition, the user has to press a REGISTER button 132 located at the bottom of the filter registration pane 125. This triggers the CPU 11 to collect entered parameters and transfer them to appropriate part of the security filter management table 15f in the HDD 15. As a result, the parameters entered in the setting screen of FIG. 27 are registered to the system.

The user may press a CANCEL button 133 to clear the entered parameters and cancel the registration. A click on this CANCEL button makes the CPU 11 erase the entered values from the dialog box 120 and restore the present values read out of the security filter management table 15f. This enables the user to start filter registration from scratch.

Additionally, the filter registration pane 125 has a DELETE button that allows the user to delete unnecessary security process primitives. When a specific primitive is displayed in the pane 125, a click on the DELETE button 134 directs the CPU 11 to erase the definition of the primitive from the HDD 15.

Optionally, the system may utilize the start date and expiration date information set in the combo boxes 125e and 125f in order to automatically manage the validity of security process primitives. More specifically, the CPU 11 refers to this information in the security filter management table 15f, each time it executes a security process primitive registered therein. The CPU 11 applies the primitive only when it is not before the start date and not after the expiration date defined by the two parameters. In this way, the system accomplishes the automatic validity management of security process primitives.

As described above, the present invention proposes to select appropriate security processes, taking into account the recipient's access privilege level and system security level, in addition to the confidentiality level of transmission data. Accordingly, the system will apply an optimal set of security processes determined through the consideration of total environment. The present invention also makes it possible to modify or upgrade a security process primitive by only changing registered data in the transmission unit 10. This alleviates workloads imposed on the end users. Furthermore, although source data is stored in a plurality of storage units, the logical structure database 15a unifies the management of such distributed data. This eliminates the need for searching for necessary data items or managing the version of each data item.

The above-described first embodiment is configured so that the confidentiality level of each individual data is concentrated in the data confidentiality level table 15b. Alternatively, such confidentiality information can be attached to each data and thus stored in a distributed manner. This structural arrangement provides unified security processes even when the data is shared by a plurality of end users.

Figure 28:
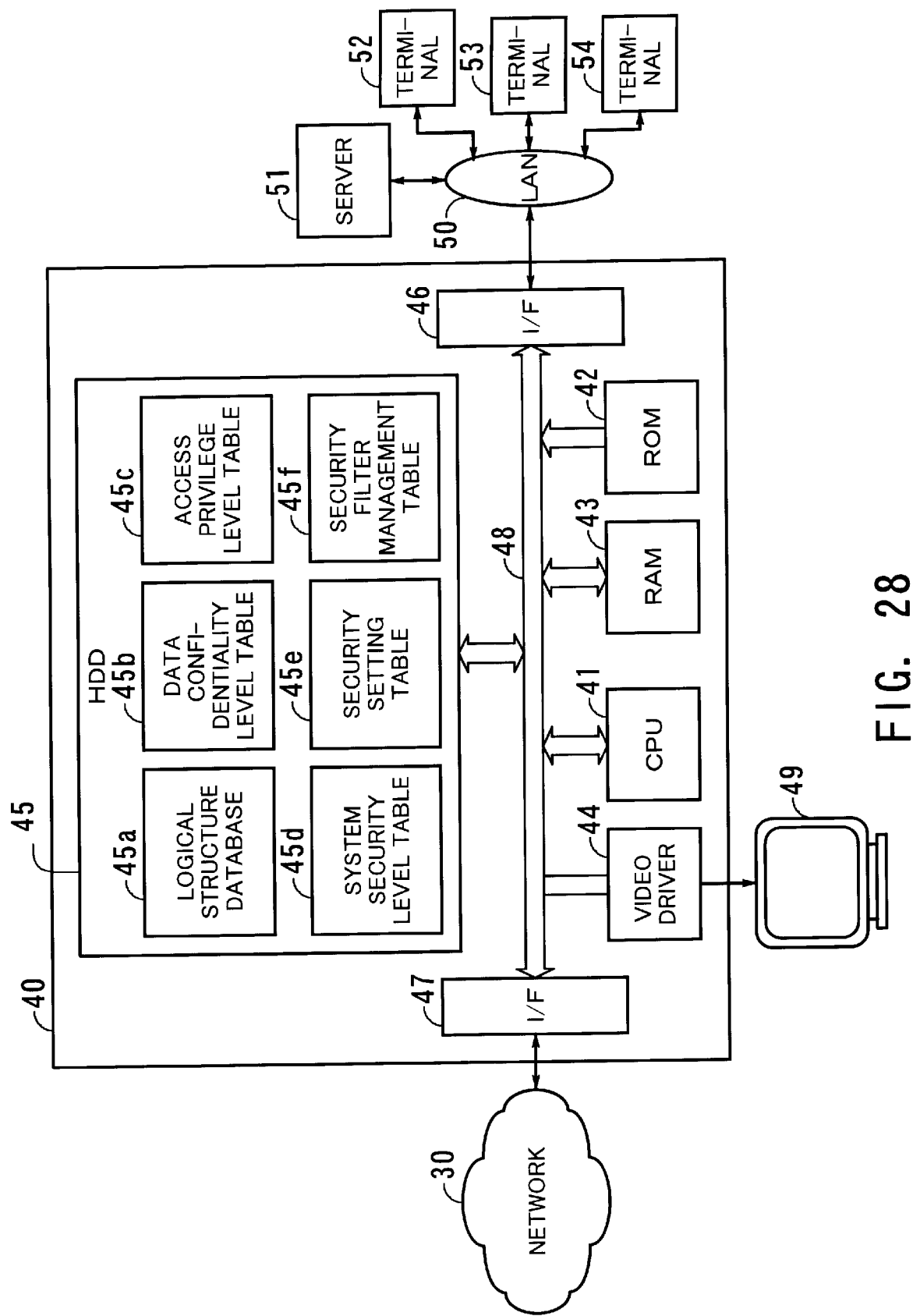
FIG. 28 is a block diagram of a reception unit according to a second embodiment of the present invention.

Referring next to FIG. 28, the following section will introduce a second embodiment of the present invention.

FIG. 28 is a block diagram of a reception unit according to a second embodiment of the present invention. Since the second embodiment shares some elements with the reception unit 40 illustrated in FIG. 3, the following explanation will not mention such common elements, while affixing like reference numerals to them. Also, the transmission unit in the second embodiment will not be explained, since it is the same as that illustrated in FIG. 2.

The reception unit of the second embodiment is distinguishable from that of FIG. 3 in that an HDD 45 stores different tables. That is, the HDD 45 shown in FIG. 28 stores a data confidentiality level table 45b, an access privilege level table 45c, a system security level table 45d, a security setting table 45e, and a security filter management table 45f, while not having a security standard table 45g, which is found in the reception device 40 of the first embodiment. These tables in the HDD 45 are similar to what the transmission device 10 of FIG. 2 has in its HDD 15.

The next section will describe the operation of the second embodiment.

Figure 29:
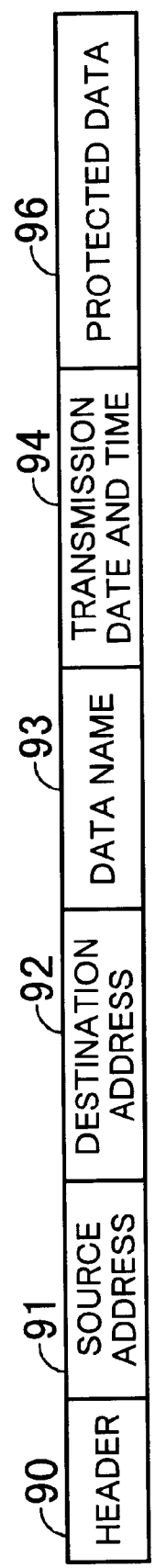
FIG. 29 is a diagram which shows a structure of data that the reception unit receives in the second embodiment of FIG. 28.

It is now assumed that the transmission unit 10 of FIG. 2 has received a data transmission request from either one of its local terminals 22 to 24. This request invokes security processes to protect data in the same way as in the first embodiment. The security-protected data is then fed to an interface 17 for packetization. FIG. 29 shows a typical packet assembled in the second embodiment. Compared to the packet in the first embodiment of FIG. 18, the packet shown in FIG. 29 has no filter number field 95. Upon receipt of such a packet, the reception device 40 first extracts a source address 91, destination address 92, and a data name 93 from the received packet.

Recall that the tables stored in the HDD 45 are equivalent to those in the HDD 15 of the transmission device 10. The CPU 41 determines the data confidentiality level from the extracted data name 93. It also determines the access privilege level and system security level from the extracted source address 91 and destination address 92, respectively. The CPU 41 uses these parameters when searching the security setting table 45e and security filter management table 45f. This makes it possible for the reception unit 40 to identify the security processes conducted on the sender side. Now that the relevant filter number is identified as such, the CPU 41 then applies its corresponding security process primitives to the received data, but in the reverse order. As a result, the reception unit 40 reconstructs the unprotected original data. The above-described structural arrangement eliminates the need for transmission of filter number information, thus making it possible to reduce the amount of transmission data.

Figure 30:
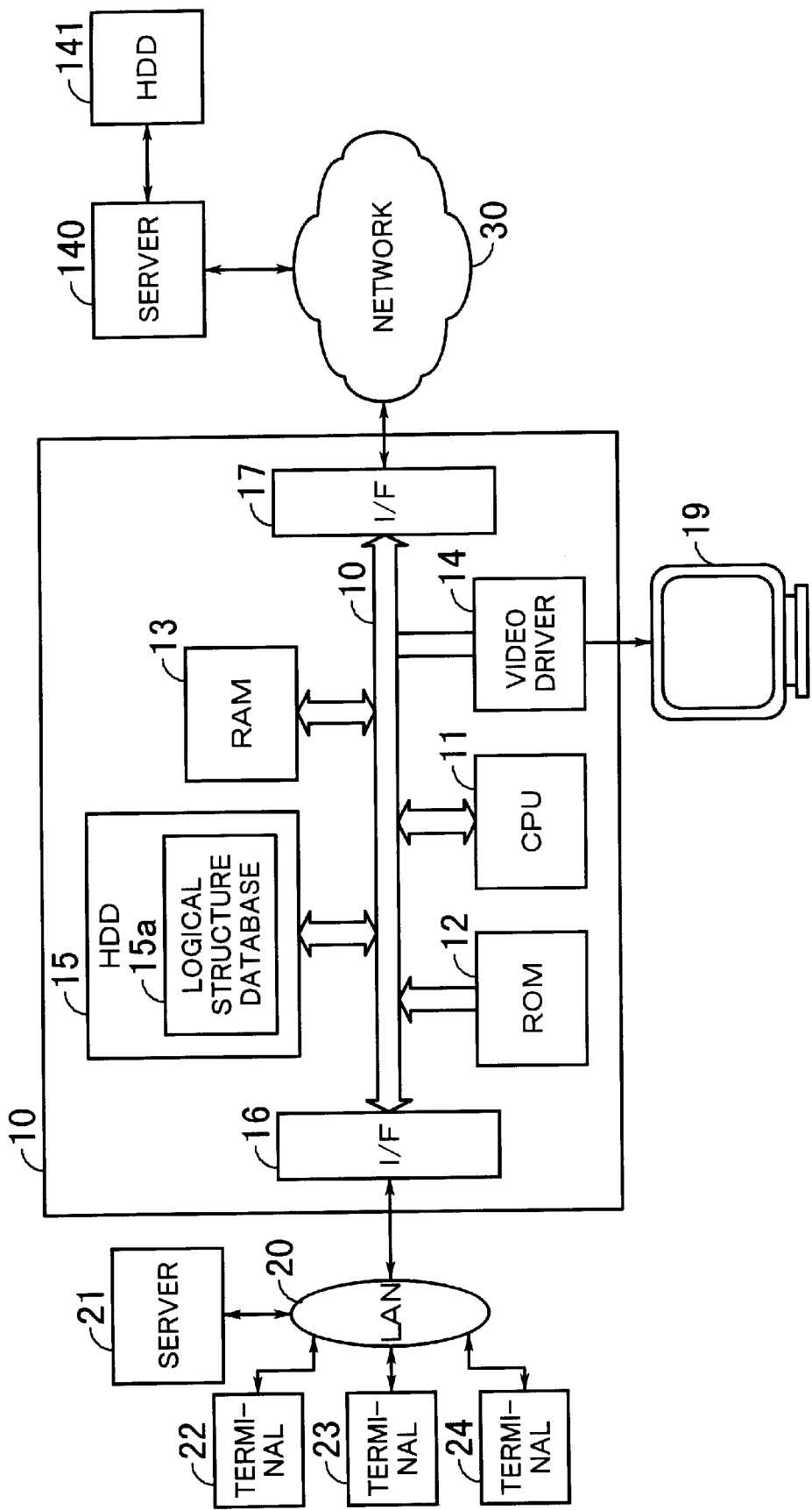
FIG. 30 is a block diagram of a transmission unit according to a third embodiment of the present invention.
Figure 31:
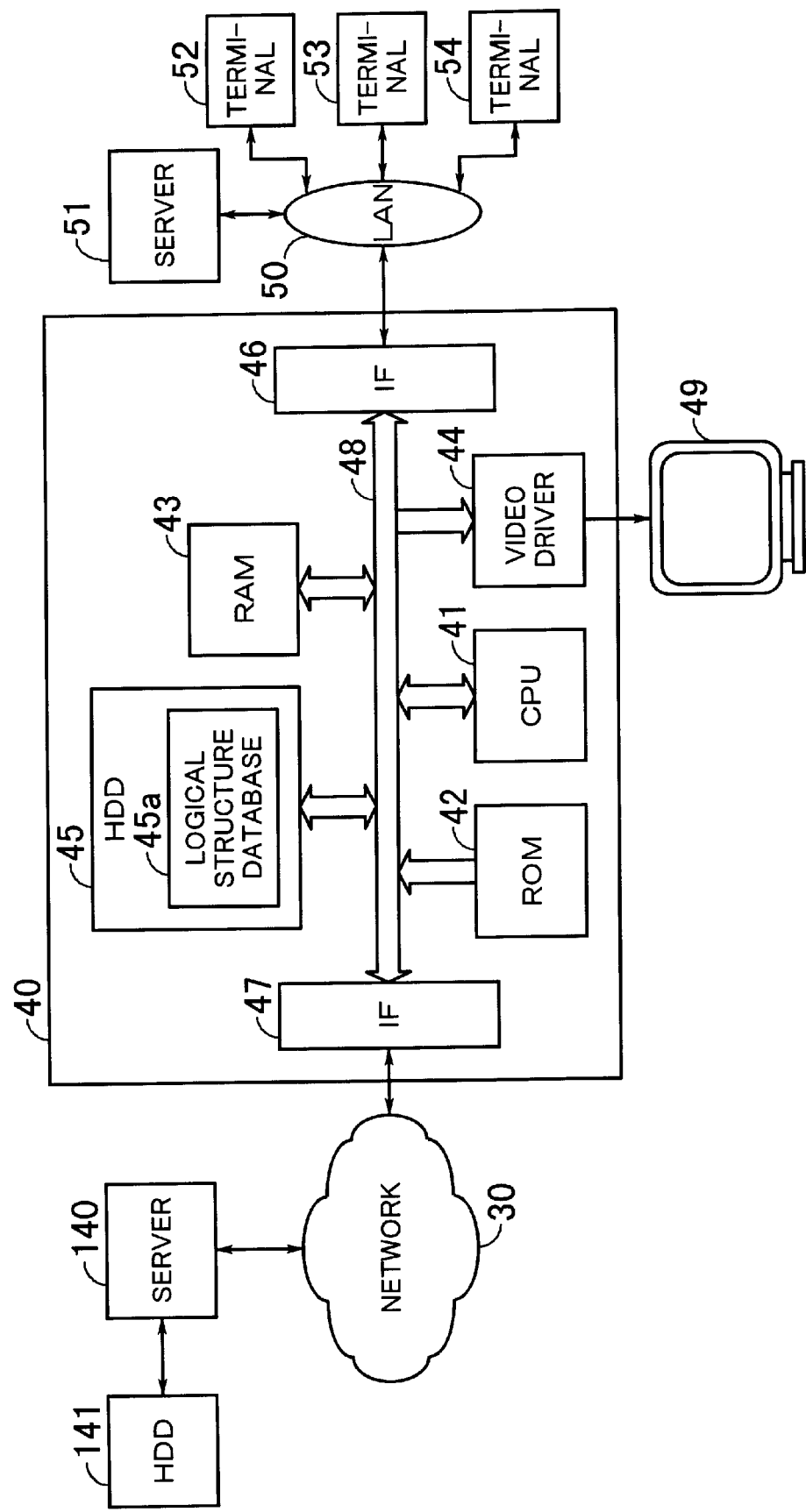
FIG. 31 is a block diagram of a reception unit according to the third embodiment of the present invention.

Referring next to FIGS. 30 and 31, the following section will describe a third embodiment of the present invention. FIGS. 30 and 31 illustrates a transmission and reception units that are identical to those explained earlier in FIGS. 2 and 3. Therefore, the following description will concentrate on distinct features of the third embodiment, while affixing like reference numerals to like elements.

FIG. 30 is a block diagram of a transmission unit according to a third embodiment of the present invention. Compared with the first embodiment of FIG. 2, the transmission unit 10 shown in FIG. 30 has removed almost all tables from its HDD 15, except for a logical structure database 15a. Another distinctive point of the third embodiment is that a server 140 and an HDD 141 are newly deployed on the network 30. The other part is just the same as FIG. 2.

FIG. 31 is a block diagram of a reception unit 40 according to the third embodiment of the present invention. Unlike the first embodiment of FIG. 3, the reception unit 40 of FIG. 31 has removed the security standard table 45g from its HDD 45. Similar to FIG. 30, a server 140 and an HDD 141 are newly deployed on the network 30. The other part is just the same as FIG. 3.

Figure 32:
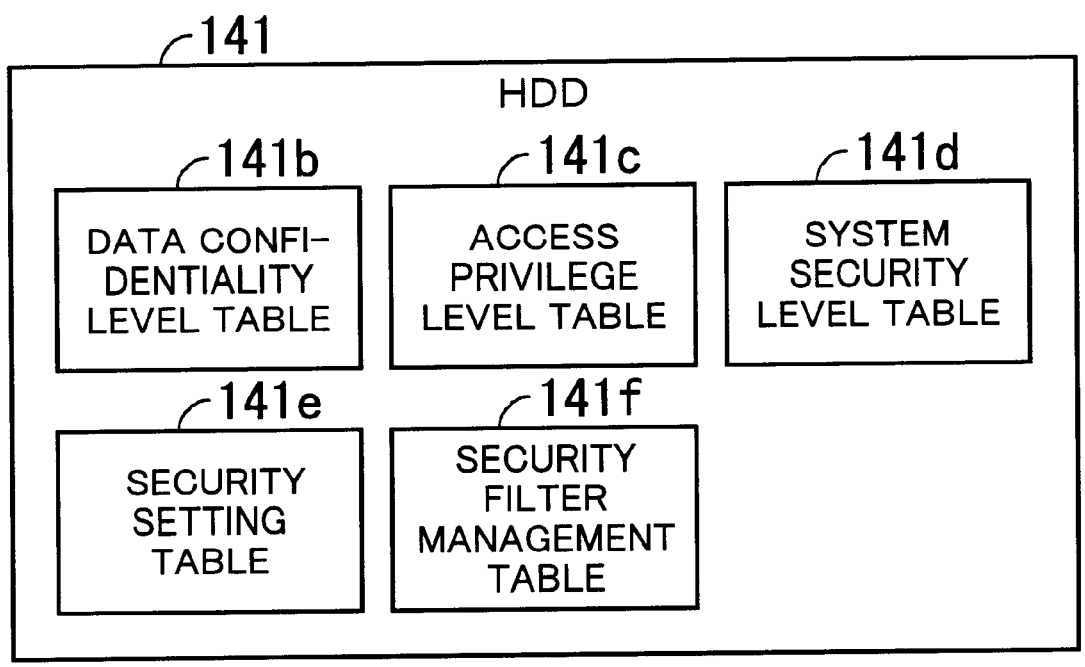
FIG. 32 is a diagram showing an example of data stored in an HDD that is coupled to a server in the third embodiment of FIG. 30.

The server 140 responds to data requests from the transmission device 10 or the reception device 40 by transferring the requested data from the HDD 141 to them via the network 30. Here, the HDD 141 stores various tables related to security protection. As FIG. 32 shows, the HDD 141 stores: a data confidentiality level table 141b, an access privilege level table 141c, a system security level table 141d, a security setting table 141e, and a security filter management table 141f. Since these tables play the same role as those stored in the HDD 15 (FIG. 2), no further explanation is provided here.

Now, the next section will describe the operation of the third embodiment.

It is assumed here that the transmission unit 10 of FIG. 30 has received a data transmission request from either one of its local terminals 22 to 24. This request triggers the CPU 11 to retrieve the requested data from distributed storage, with reference to the logical structure database 15a in its local HDD 15. The CPU 11 then obtains the following information from the server 140 via the network 30: the confidentiality level of the collected data, the access privilege level and system security level of the recipient, and the kinds of relevant security process primitives and their execution order. The CPU 11 applies these security process primitives to the data in the specified order and feeds the result to an interface 17. The interface 17 packetizes and transmits the security-protected data to the reception unit 40. FIG. 29 shows the packet format. Upon receipt of such a packet, the CPU 41 in the reception device 40 extracts a source address 91, a destination address 92, and a data name 93 from the received packet. It then obtains a relevant filter number from the server 140. Now that the underlying security process primitives are known, the CPU 41 applies them to the received data in the reverse order, thereby reconstructing the original data.

In the third embodiment described above, the transmission unit and reception unit share the security-related tables stored in a server, instead of having their local copies. This configuration provides common ground for the network-wide security processes.

The proposed processing mechanisms are actually implemented as software and hardware functions of a computer system. Process steps that the proposed transmission and reception units execute are encoded in a computer program, which will be stored in a computer-readable storage medium. The intended processing functions are realized by making such computer programs run on an appropriate computer platform.

Suitable computer-readable storage media include magnetic storage media and solid state memory devices. Portable storage media, such as compact disk read-only memory (CD-ROM) and floppy disks, can be used for circulation purposes. Further, it will be possible to distribute programs through an appropriate server computer deployed on a network. The program files delivered to users are normally installed in their computer's hard drive or other local mass storage devices, which will be executed after being loaded to the main memory.

The above discussion will now be summarized as follows. According to the present invention, the transmission unit protects transmission data by applying security processes relevant to the data's confidentiality level that is determined from data attribute information and communication environment. The protected data is transmitted, together with identification data that indicates such security processes applied. The reception unit uses this identification data to unprotect the received data. This structural arrangement makes it possible to standardize the processes of security protection, even in the case that a plurality of end users are involved in the data transmission. The present invention also makes reliable security processing possible, without increasing the burden on the end users.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network system in which a sender transmits data to a recipient over a network after applying appropriate security processes to the data, the system comprising:

a transmission unit comprising:

at least one table containing information about data confidentiality levels of different kinds of data and about security processes required in each data confidentiality level, the data confidentiality levels being determined from data attribute information and communication environment, security processing means for determining the data confidentiality level of given data to be transmitted to the recipient and identifying which security processes to apply thereto, with reference to said at least one table, and applying the identified security processes to the data, identification data attaching means for attaching identification data to the data to allow the recipient to identify the security processes that said security processing means has applied, and transmission means for transmitting the data over the network to the recipient, together with the identification data being attached thereto; and a reception unit, coupled to said transmission unit via the network, comprising:

reception means for receiving the data that is sent over the network by said transmission unit, identification data extracting means for extracting the identification data that is attached to the data, and unprotecting means for unprotecting the data by using the identification data extracted by said identification data extracting means.

2. The network system according to claim 1, the transmission unit further comprising:

data management means, disposed in said transmission unit, for performing centeralized management of the data being stored in a plurality of storage units in a distributed manner; and data collection means, disposed in said transmission unit, for collecting the data to be transmitted, with reference to said data management means.

3. The network system according to claim 1, wherein said security processing means executes the security processes, taking into account an access privilege level of the recipient.

4. The network system according to claim 3, wherein said security processing means executes the security processes, taking into account a system security level that indicates a security level of a system constructed by said reception unit and the network.

5. The network system of claim 1, wherein if any security process primitives are outside of a predetermined range, the system denies requested transmission for lack of security.

6. A method of transporting data from a transmission unit to a reception unit over a network after applying appropriate security processes to the data, the method comprising:

at the transmission unit, determining the data confidentiality level of given data to be transmitted to the recipient and identifying which security processes to apply thereto, with reference to at least one table containing information about data confidentiality levels of different kinds of data and about security processes required in each data confidentiality level, the data confidentiality levels being determined from data attribute information and communication environment;

at the transmission unit, applying security processes to data that is to be transmitted to the reception unit, the security processes being relevant to a data confidentiality level that is determined from data attribute information and communication environment;

at the transmission unit, attaching identification data to the data to allow the recipient to identify what security processes have been applied to the data;

at the transmission unit, transmitting the data over the network to the reception unit, together with the identification data being attached thereto;

at the reception unit, receiving the data that is sent over the network by the transmission unit;

at the reception unit, extracting the identification data that is attached to the data; and at the reception unit, unprotecting the data by using the identification data extracted.

7. A transmission unit which transmits data to a reception unit over a network after applying appropriate security processes to the data, the transmission unit comprising:

at least one table containing information about data confidentiality levels of different kinds of data and about security processes required in each data confidentiality level, the data confidentiality levels being determined from data attribute information and communication environment;

security processing means for determining the data confidentiality level of given data to be transmitted to the recipient and identifying which security processes to apply thereto, with reference to said at least one table, and applying the identified security processes to the data;

identification data attaching means for attaching identification data to the data to allow the recipient to identify what security processes said security processing means has applied; and transmission means for transmitting the data over the network to the reception unit, together with the identification data being attached thereto.

8. A computer-readable storage medium for storing a computer program to be used to transport data over a network from a transmission unit to a reception unit after applying appropriate security processes to the data, the computer program being designed to run on a computer in order to cause the computer to function as:

at least one table containing information about data confidentiality levels of different kinds of data and about security processes required in each data confidentiality level, the data confidentiality levels being determined from data attribute information and communication environment;

security processing means for determining the data confidentiality level of given data to be transmitted to the recipient and identifying which security processes to apply thereto, with reference to said at least one table, and applying the identified security processes to the data;

identification data attaching means for attaching identification data to the data to allow the recipient to identify the security processes that said security processing means has applied; and transmission means for transmitting the data over the network to the reception unit, together with the identification data being attached thereto.

9. A reception unit to receive data to which security processes are applied by a transmission unit, comprising:
   reception means for receiving the data that is sent over a network by the transmission unit;
   identification data extracting means for extracting identification data that is attached to the data; and
   unprotecting means for unprotecting the data by using the identification data extracted by said identification data extracting means,
   wherein the data is not encrypted or transmitted if an intended recipient does not have adequate privileges.

10. A computer-readable storage medium for storing a computer program to be used to receive data to which security processes are applied by a transmission unit, the computer program being designed to run on a computer in order to cause the computer to function as:
    reception means for receiving the data that is sent over a network by the transmission unit;
    identification data extracting means for extracting identification data that is attached to the data; and
    unprotecting means for unprotecting the data by using the identification data extracted by said identification data extracting means,
    wherein the data is not encrypted or transmitted if an intended recipient does not have adequate privileges.

11. A network system in which a sender transmits data to a recipient over a network after applying appropriate security processes to the data, the system comprising:
    a transmission unit comprising:
        security processing means for applying security processes to data that is to be transmitted to the recipient, the security processes being relevant to a data confidentiality level that is determined from data attribute information and communication environment,
        identification data attaching means for attaching identification data to the data to allow the recipient to identify the security processes that said security processing means has applied, and
        transmission means for transmitting the data over the network to the recipient, together with the identification data being attached thereto; and
    a reception unit, coupled to said transmission unit via the network, comprising:
        reception means for receiving the data that is sent over the network by said transmission unit,
        identification data extracting means for extracting the identification data that is attached to the data, and
        unprotecting means for unprotecting the data by using the identification data extracted by said identification data extracting means,
    wherein said security processing means executes the security processes, taking into account an access privilege level of the recipient,
    wherein said security processing means executes the security processes, taking into account a system security level that indicates a security level of a system constructed by said reception unit and the network,
    wherein said transmission unit further comprises:
        a first table which defines the data confidentiality level of the data to be transmitted, and the access privilege level and system security level of the recipient; and
        a second table which defines combinations of security process primitives and execution order thereof, in association with possible combinations of the data confidentiality level, the access privilege level, and system security level,
    wherein said security processing means applies the security processes to the data to be transmitted to the recipient, according to one of the combinations of security process primitives and execution order thereof that is determined from said second table,
    wherein said identification data attaching means attaches the identification data to the security-protected data to enable the reception unit to identify the combination of security process primitives and the execution order that have been applied to the data by said security processing means,
    wherein said identification data extracting means extracts the identification data that shows the combination of security process primitives and the execution order, and
    wherein said unprotecting means unprotects the data by using the extracted identification data that shows the combination of security process primitives and the execution order.

12. The network system according to claim 11, further comprising security process primitive adding means, disposed in said transmission unit, for adding a new security process primitive.

13. The network system according to claim 11, further comprising security process primitive modifying means for modifying the existing security process primitives.

14. A network system in which a sender transmits data to a recipient over a network after applying appropriate security processes to the data, the system comprising:
    a transmission unit comprising:
        security processing means for applying security processes to data that is to be transmitted to the recipient, the security processes being relevant to a data confidentiality level that is determined from data attribute information and communication environment,
        identification data attaching means for attaching identification data to the data to allow the recipient to identify the security processes that said security processing means has applied, and
        transmission means for transmitting the data over the network to the recipient, together with the identification data being attached thereto; and
    a reception unit, coupled to said transmission unit via the network, comprising:
        reception means for receiving the data that is sent over the network by said transmission unit,
        identification data extracting means for extracting the identification data that is attached to the data, and
        unprotecting means for unprotecting the data by using the identification data extracted by said identification data extracting means,
    wherein said security processing means executes the security processes, taking into account an access privilege level of the recipient,
    wherein said security processing means executes the security processes, taking into account a system security level that indicates a security level of a system constructed by said reception unit and the network,
    both of said transmission unit and said reception unit further comprise:
        a first table which defines the data confidentiality level of the data to be transmitted, and the access privilege level and system security level of the recipient, and a second table which defines combinations of security process primitives and execution order thereof, in association with possible combinations of the data confidentiality level, the access privilege level, and system security level;

wherein said security processing means applies the security processes to the data to be transmitted to the recipient, according to one of the combinations of security process primitives and execution order thereof that is obtained from said second table, wherein said identification data attaching means attaches the identification data to the security-protected data to inform the reception unit of a sender name and a data name, wherein said identification data extracting means extracts the sender name and the data name from the received data, and wherein said unprotecting means obtains a combination of security process primitives and execution order of the security process primitives from said first and second table by using the extracted sender name and data name as keywords, and unprotects the data according to the obtained information.

15. A network system in which a sender transmits data to a recipient over a network after applying appropriate security processes to the data, the system comprising:

a transmission unit comprising:
security processing means for applying security processes to data that is to be transmitted to the recipient, the security processes being relevant to a data confidentiality level that is determined from data attribute information and communication environment, identification data attaching means for attaching identification data to the data to allow the recipient to identify the security processes that said security processing means has applied, and transmission means for transmitting the data over the network to the recipient, together with the identification data being attached thereto; and a reception unit, coupled to said transmission unit via the network, comprising:
reception means for receiving the data that is sent over the network by said transmission unit, identification data extracting means for extracting the identification data that is attached to the data, and unprotecting means for unprotecting the data by using the identification data extracted by said identification data extracting means, wherein said security processing means executes the security processes, taking into account an access privilege level of the recipient, wherein said security processing means executes the security processes, taking into account a system security level that indicates a security level of a system constructed by said reception unit and the network, wherein said transmission unit and said reception unit share a first and second tables which are placed at a predetermined location on the network, wherein said first table defines the data confidentiality level of the data to be transmitted, and the access privilege level and system security level of the recipient, wherein said second table defines combinations of security process primitives and execution order thereof, in association with possible combinations of the data confidentiality level, the access privilege level, and system security level, wherein said security processing means applies the security processes to the data to be transmitted to the recipient, according to one of the combinations of security process primitives and execution order thereof that is obtained from said second table, wherein said identification data attaching means attaches the identification data to the security-protected data to inform the reception unit of a sender name and a data name, wherein said identification data extracting means extracts the sender name and the data name from the received data, and wherein said unprotecting means obtains a combination of security process primitives and execution order of the security process primitives from said first and second table by using the extracted sender name and data name as keywords, and unprotects the data according to the obtained information.

* * * * *